(12) United States Patent
Maxwell et al.

(10) Patent No.: US 12,418,019 B2
(45) Date of Patent: Sep. 16, 2025

(54) CATHODE WITH PRE-LITHIATION COATING AND METHODS FOR PREPARATION AND USE

(71) Applicant: A123 Systems LLC, Novi, MI (US)

(72) Inventors: Derrick Maxwell, Winthrop, MA (US); Xiangyang Zhu, Watertown, MA (US); Jun Wang, Shrewsbury, MA (US); Taehwan Yu, Burlington, MA (US); Weidong Zhou, Winchester, MA (US); Sookyung Jeong, Burlington, MA (US); Derek C. Johnson, Fort Collins, CO (US); Linghong Zhang, Waltham, MA (US); Kerui Sun, Cambridge, MA (US); Nathan Reinsma, Medford, MA (US); Xiaorui Chen, Waltham, MA (US)

(73) Assignee: A123 SYSTEMS LLC, Novi, MI (US)

( * ) Notice: Subject to any disclaimer, the term of this patent is extended or adjusted under 35 U.S.C. 154(b) by 748 days.

(21) Appl. No.: 17/414,304

(22) PCT Filed: Dec. 20, 2019

(86) PCT No.: PCT/US2019/068133
§ 371 (c)(1),
(2) Date: Jun. 15, 2021

(87) PCT Pub. No.: WO2020/132622
PCT Pub. Date: Jun. 25, 2020

(65) Prior Publication Data
US 2022/0020977 A1    Jan. 20, 2022

Related U.S. Application Data

(60) Provisional application No. 62/784,283, filed on Dec. 21, 2018.

(51) Int. Cl.
*H01M 4/1391* (2010.01)
*C01G 53/50* (2025.01)
(Continued)

(52) U.S. Cl.
CPC .......... *H01M 4/1391* (2013.01); *C01G 53/50* (2013.01); *H01M 4/525* (2013.01);
(Continued)

(58) Field of Classification Search
CPC ............... H01M 4/1391; H01M 4/525; H01M 2004/028; C01P 2004/51
See application file for complete search history.

(56) References Cited

U.S. PATENT DOCUMENTS 4,732,751 A * 3/1988 Salmon ................... C01D 15/02
423/641
5,705,291 A * 1/1998 Amatucci ............. H01M 4/505
29/623.5
(Continued)

OTHER PUBLICATIONS

Debart, A. et al., "An O2 cathode for rechargeable lithium batteries: The effect of a catalyst," Journal of Power Sources, vol. 174, vol. 2, Dec. 6, 2007, 6 pages.
(Continued)

*Primary Examiner* — Aiqun Li
(74) *Attorney, Agent, or Firm* — McCoy Russell LLP

(57) ABSTRACT

Methods and systems are provided for a cathode material for lithium ion batteries. In one example, the cathode material may include a lithium mixed metal oxide core and a surface coating surrounding the core. Optionally, a passivating layer may continuously surround the surface coating. In some examples, the surface coating or surface layer may include a sacrificial lithium source, a lithium-based active cathode
(Continued)

catalyst, or a combination thereof. In other examples, methods are provided for manufacturing the cathode material for use in a lithium ion battery.

15 Claims, 17 Drawing Sheets

(51) Int. Cl.
H01M 4/02 (2006.01)
H01M 4/525 (2010.01)
H01M 10/0525 (2010.01)

(52) U.S. Cl.
CPC ..... *H01M 10/0525* (2013.01); *C01P 2004/51* (2013.01); *C01P 2006/11* (2013.01); *H01M 2004/028* (2013.01)

(56) References Cited

U.S. PATENT DOCUMENTS

| | | |
|---|---|---|
| 2007/0224506 A1 | 9/2007 | Ooyama et al. |
| 2013/0143122 A1 | 6/2013 | Huang |
| 2015/0111099 A1 | 4/2015 | Zhang |
| 2015/0280230 A1 | 10/2015 | Mizuno et al. |
| 2016/0372784 A1 | 12/2016 | Hayner et al. |
| 2017/0194625 A1 | 7/2017 | Woehrle et al. |
| 2017/0214089 A1* | 7/2017 | Jimenez ............ H01M 10/0525 |
| 2017/0309914 A1 | 10/2017 | Drews et al. |

OTHER PUBLICATIONS

Johnson, C. et al., "Li2O Removal from Li5FeO4: A Cathode Precursor for Lithium-Ion Batteries," Chemistry of Materials, vol. 22, No. 3, Jan. 11, 2010, 8 pages.

Xu, W. et al., "Investigation on the charging process of Li2O2-based air electrodes in Li—O2 batteries with organic carbonate electrolytes," Journal of Power Sources, vol. 196, No. 8, Apr. 15, 2011, 6 pages.

Sun, Y. et al., "High-capacity battery cathode prelithiation to offset initial lithium loss," Nature Energy, vol. 1, No. 15008, Jan. 11, 2016, 7 pages.

Sun, Y. et al., "In Situ Chemical Synthesis of Lithium Fluoride/Metal Nanocomposite for High Capacity Prelithiation of Cathodes," Nano Letters, vol. 16, No. 2, Jan. 19, 2016, 13 pages.

Park, K. et al., "Li3N as a Cathode Additive for High-Energy-Density Lithium-Ion Batteries," Advanced Energy Materials, vol. 6, No. 10, Mar. 1, 2016, 7 pages.

Sun, Y. et al., "Lithium Sulfide/Metal Nanocomposite as a High-Capacity Cathode Prelithiation Material," Advanced Energy Materials, vol. 6, No. 13, Jul. 2016, 15 pages.

Zhu, Z. et al., "Anion-redox nanolithia cathodes for Li-ion batteries," Nature Energy, vol. 1, No. 16111, Jul. 25, 2016, 7 pages.

Jezowski, P.,"Lithium-Ion Capacitors Based On In-Situ Pre-Lithiation of the Graphite Electrode From a Composite Positive Electrode," Doctoral Dissertation in Chemical Technology, Ponzan University of Technology, Faculty of Chemical Technology, Aug. 29, 2016, 183 pages.

Su, X. et al., "A new strategy to mitigate the initial capacity loss of lithium ion batteries," Journal of Power Sources, vol. 324, Aug. 30, 2016, 8 pages.

Bie, Y. et al., "Li2O2 as a cathode additive for the initial anode irreversibility compensation in lithium-ion batteries," Chemical Communications, vol. 59, Jun. 30, 2017, 15 pages.

Zhan, C. et al., "Enabling the high capacity of lithium-rich anti-fluorite lithium iron oxide by simultaneous anionic and cationic redox," Nature Energy, vol. 2, Dec. 8, 2017, 9 pages.

Holstiege, F. et al., "Pre-Lithiation Strategies for Rechargeable Energy Storage Technologies: Concepts, Promises and Challenges," Batteries, vol. 4, No. 41, Jan. 23, 2018, 39 pages.

Zhan, Y. et al., "Application of Li2S to compensate for loss of active lithium in a Si—C anode," Journal of Materials Chemistry A, vol. 6, Mar. 14, 2018, 6 pages.

Zhang, L. et al., "Mitigating the initial capacity loss and improving the cycling stability of silicon monoxide using Li5FeO4," Journal of Power Sources, vol. 400, Oct. 1, 2018, Available Online Aug. 25, 2018, 12 pages.

ISA Korean Intellectual Property Office, International Search Report Issued in Application No. PCT/US2019/068133, Apr. 29, 2020, WIPO, 11 pages.

\* cited by examiner

CATHODE WITH PRE-LITHIATION COATING AND METHODS FOR PREPARATION AND USE

CROSS REFERENCE TO RELATED APPLICATIONS

The present application is a U.S. National Phase of International Application No. PCT/US2019/068133, entitled "CATHODE WITH PRE-LITHIATION COATING AND METHODS FOR PREPARATION AND USE," filed on Dec. 20, 2019. International Application No. PCT/US2019/068133_claims priority to U.S. Provisional Application No. 62/784,283, entitled "CATHODE WITH PRE-LITHIATION COATING AND METHODS FOR PREPARATION AND USE," and filed on Dec. 21, 2018. The entire contents of each of the above-identified applications are hereby incorporated by reference for all purposes.

FIELD

The present description relates generally to a cathode material and methods for preparation and use in lithium ion batteries.

BACKGROUND AND SUMMARY

Lithium (Li) ion batteries are and have been widely used in a number of different applications, including, but not limited to, consumer electronics, uninterruptible power supplies, transportation, and stationary applications. To meet the increasing demand for energy storage, particularly for use in electric vehicles, attention has shifted towards more energy-dense lithium mixed metal oxide layered structured materials which have high energy density, large voltage windows, and good cycle life compared to other material counterparts. For example, high nickel content positive electrode active materials, such as lithium nickel manganese cobalt oxide ($LiNi_xMn_yCo_{1-x-y}O_2$ or NMC) and lithium nickel cobalt aluminum oxide ($LiNi_xCo_yAl_{1-x-y}O_2$ or NCA), have been used to produce high energy Li ion batteries. These layered lithium mixed metal oxide compounds offer a higher capacity of up to approximately 200 mAh/g at potentials greater than 3.0 V vs. $Li/Li^+$ compared to other materials.

Li ion batteries function by passing Li ions from a positive electrode, or cathode, including positive electrode active materials to a Li-based negative electrode, or anode, during charging and then passing Li ions back to the cathode from the anode during discharge. A consequence of the charge/discharge process is the formation of a solid-electrolyte interphase (SEI) layer on the anode during the first charge cycle. The SEI may prove detrimental to electrochemical performance as the formation process results in significant Li ion consumption, particularly in silicon-based anodes (as opposed to pure graphite anodes). As such, SEI formation may lower the first-cycle Coulombic efficiency (FCE) in anodes including silicon or silicon-graphite composites.

To counter low FCE due to anodic SEI formation, a pre-lithiation approach may be employed to provide the anode with extra Li ions prior to, or during, first charge/discharge. Such a pre-lithiation approach may be accomplished in a number of ways, such as chemical treatment of the anode or incorporation of a sacrificial Li source at the cathode. Regarding the latter case, a sacrificial Li source may be added to the cathode such that an increased amount of Li ions may flow to the anode during initial charging of the Li ion battery. A cathode catalyst (CC), such as a Li-based active CC (ACC), may further be incorporated to both lower the potential and increase the rate of decomposition of the sacrificial Li source. It will be appreciated that, in many cases, a given catalyst may be selected to lower an activation energy of a reaction, where the catalyst does not undergo any permanent chemical change. However, though a given ACC may act as a catalyst to lower an overpotential of the decomposition of the sacrificial Li source, a voltage profile of the ACC may change following action as a catalyst. Such a change in the voltage profile may suggest concomitant structural changes to the ACC or a surface thereof. Regardless, following catalytic action, the ACC may still provide reversible capacity and act as an active material in a given battery system.

In some cases, a Li-based ACC may act as a catalyst before Li is released during the charge process of a Li-ion battery. In some cases, a Li-based ACC may be partially or fully charged before acting as a catalyst. In such cases, the Li-based ACC may have partially or fully lost Li in a structure thereof, and the corresponding Li-deficient structure may be considered the actual CC of the catalyst to the reaction of sacrificial Li source decomposition.

Attempts have been made to utilize a sacrificial Li source which both decomposes to provide excess Li ions and is unlikely to re-form upon discharge, thereby leaving the excess Li ions available to the anode. For example, U.S. Patent Application Publication No. 2017/0309914 provides a cathode coated in lithium active materials slurried with lithium peroxide ($Li_2O_2$) as a sacrificial Li source and cobalt tetraoxide ($CO_3O_4$) as a CC. However, no means is provided to protect the sacrificial Li source from reacting with electrolytic components. In another example, Bie et al., in "$Li_2O_2$ as a Cathode Additive for the Initial Anode Irreversibility Compensation in Lithium-Ion Batteries," *Chem. Commun.*, 2017, vol. 53, pp. 8324-8327, provide a battery cell containing a NMC-based cathode fabricated with a slurry-based process including $Li_2O_2$ as a sacrificial Li source and additional NMC, ball-milled into smaller particulates, as an ACC. However, use of NMC as the ACC showed poor reversibility. The smaller NMC particles therefore hampered performance as an inactive residue after a few cycles. Lithium hydroxide and lithium carbonate were generated as additional inactive residues as a result of interactions between $Li_2O_2$ and air and/or moisture in the battery cell, which may further deteriorate electrochemical performance.

In an alternative approach, anti-fluorite structured materials such as $Li_5FeO_4$ may be utilized as the sacrificial Li source (see, for example, Su et al. in "A New Strategy to Mitigate the Initial Capacity Loss of Lithium Ion Batteries," *J. Power Sources*, 2016, vol. 324, pp. 150-157 and Zhan et al. in "Enabling the High Capacity of Lithium-Rich Anti-Fluorite Lithium Iron Oxide by Simultaneous Anionic and Cationic Redox," *Nat. Energy*, 2017, vol. 2, pp. 963-971). Such materials may be advantageous in that a CC may not be required for decomposition. However, as discussed above in relation to $Li_2O_2$, sensitivity to impurities, fabrication conditions, and/or electrolytic components, such as moisture, may hinder performance.

The inventors have identified the above problems and have determined solutions to at least partially solve them. As detailed herein, a cathodic configuration is presented to overcome the difficulties presented above. In one example, a cathodic material for use in a lithium ion battery may include lithium mixed metal oxide (e.g., NMC) core particles coated in a sacrificial lithium source, such as lithium peroxide, and optionally an active cathode catalyst. In an additional or alternative example, the sacrificial lithium source may be lithium aluminum oxide, an anti-fluorite structured material with the advantages described above, as well as additional benefits of furnishing decomposition byproducts which may possess a secondary purpose similar to aluminum oxide coatings (e.g., safety, cycling stability). The coated core particles are optionally further coated in a passivating layer, which allows release of at least some decomposition byproducts, such as oxygen, while simultaneously protecting the coated core particles from impurities and/or electrolytic components, such as water or other solvents. In this way, performance degradation ascribed to inactive residues in a battery cell incorporating the cathodic material may be mitigated.

As a further example, a method for manufacturing a cathodic material may include milling sacrificial lithium source and cathode catalyst powders to predetermined average sizes. As such, each of the sizes of the powders, as well as a weight ratio of an amount of the sacrificial lithium source powder to the cathode catalyst powder, may be selected for optimal performance. The method may further include mixing a lithiated core powder with the sacrificial lithium source and cathode catalyst powders such that a coated core material may be obtained. An optional passivating layer may then be applied to protect the coated core material from deleterious impurities and/or electrolytic components.

In yet another example, a method for manufacturing a cathodic material may include converting a surface layer of a lithiated core material into a sacrificial lithium source material and/or a cathode catalyst such that a coated core material may be obtained. In some examples, the surface layer may include a chemical precursor. In additional or alternative examples, the surface layer may include the lithiated core material itself, which may include impurities. The impurities may be formed during the synthesis process of the lithiated core material. The impurities may include, but are not limited to, $Li_2O$, $LiOH$, and $Li_2CO_3$. In these or alternative examples, the surface layer may include impurities remaining from synthesis of the lithiated core material. As such, the sacrificial lithium source material and/or cathode catalyst may be chemically formed at a surface of the lithiated core material. An optional passivating layer may then be applied to protect the coated core material from deleterious impurities and/or electrolytic components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
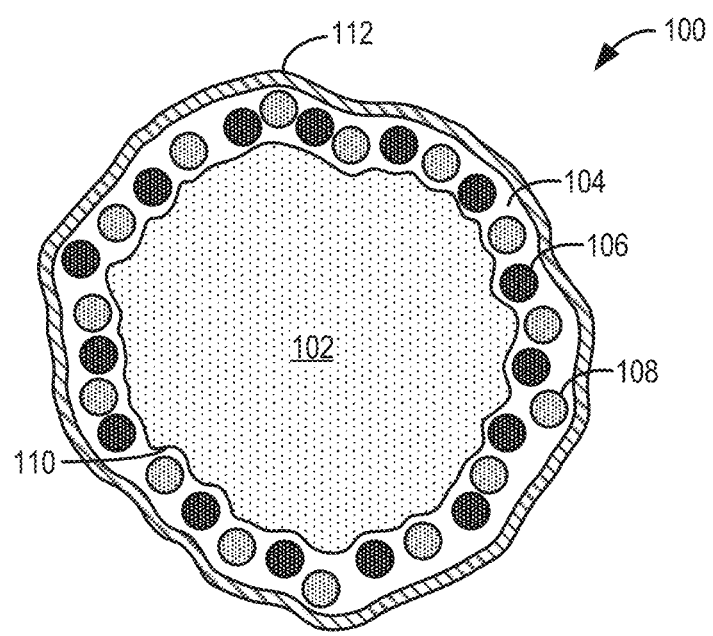
FIG. 1 shows a schematic illustration of a coated positive electrode active material with sacrificial lithium source and cathode catalyst (CC) particles, in addition to a passivating layer.

The following description relates to systems and methods for a cathode material including a lithiated compound core and a surface coating. The core may be a lithium composite compound, such as a lithium metal oxide (LMO), a lithium phosphate compound, or a combination thereof. Herein, "lithium metal oxide" or "LMO" may refer to any oxide compound including lithium and at least one metal element. Likewise, "lithium phosphate compound" as used herein may refer to any phosphate compound including at least lithium. Further, "lithium mixed metal oxide" may refer to any oxide compound including lithium and at least two metal elements.

The surface coating may coat the core and may include sacrificial lithium source particles including lithium peroxide, lithium aluminum oxide (LAO), lithium iron oxide (LFO), lithium oxide, lithium nitride, lithium sulfide, lithium azide, a conversion-type pre-lithiation reagent, or a combination thereof. Herein, lithium peroxide may refer to a compound having a composition of $Li_2O_2$, lithium aluminum oxide or LAO may refer to a compound having a composition of $Li_5AlO_4$, lithium iron oxide or LFO may refer to a compound having a composition of $Li_5FeO_4$, lithium oxide or lithia may refer to a compound having a composition of $Li_2O$, lithium nitride may refer to a compound having a composition of $Li_3N$, lithium sulfide may refer to a compound having a composition of $Li_2S$, and lithium azide may refer to a compound having a composition of $LiN_3$. A conversion-type pre-lithiation reagent may be a blend of one or more metals and one or more of $Li_2O$, LiF, and/or $Li_2S$, such that a conversion reaction may release lithium ions and a corresponding metal compound, such as a metal oxide, metal fluoride, or metal sulfide. The surface coating may further include cathode catalyst (CC) particles including one or more of a metal oxide, a LMO, a lithium phosphate compound, a metal phosphate compound, or a combination thereof.

A passivating layer may be considered to continuously, uniformly, or discretely coat the surface coating (or a surface layer), such that the surface coating may be disposed between the core and the passivating layer. Herein, "continuous" or "continuously" or "conformal" or "conformally" when describing a shell and/or layer and/or coating of a particle may refer to complete or substantially complete coverage of a coated surface area of the particle with a continuous or conformal film. Further, "uniform" or "uniformly" when describing a shell and/or layer and/or coating of a particle may refer to a similar or substantially similar amount of coverage of any portion of the coated surface area of the particle relative to any other portion of the coated surface area of the particle. Further, "discrete" or "discretely" where describing a shell and/or layer and/or coating of a particle may refer to complete or substantially complete coverage of the coated surface area of the particle with a discrete particulate layer. Further, as used herein, "about" may refer to a numerical value having a tolerance or deviation of up to 10%.

Figure 2:
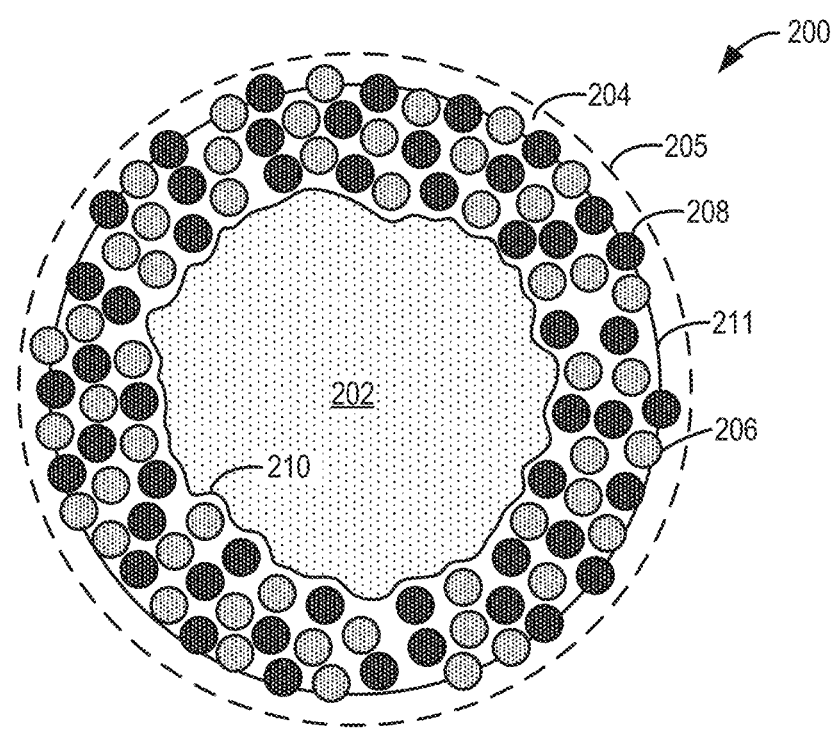
FIG. 2 shows a schematic illustration of a coated positive electrode active material with at least sacrificial lithium source and CC particles included in a surface coating.

FIGS. 1 and 2 show embodiments of coated positive electrode active material particles which may be used as a cathode material. FIG. 1 shows a schematic illustration of a core particle, wherein the core particle may have a surface coating including sacrificial lithium source and CC particles. The surface coating may further be coated with a passivating layer, such that the surface coating may be disposed between the core particle and the passivating layer. FIG. 2 shows a schematic illustration of a core particle, wherein the core particle may have a surface coating including sacrificial lithium source and CC particles and a binder.

Figure 3:
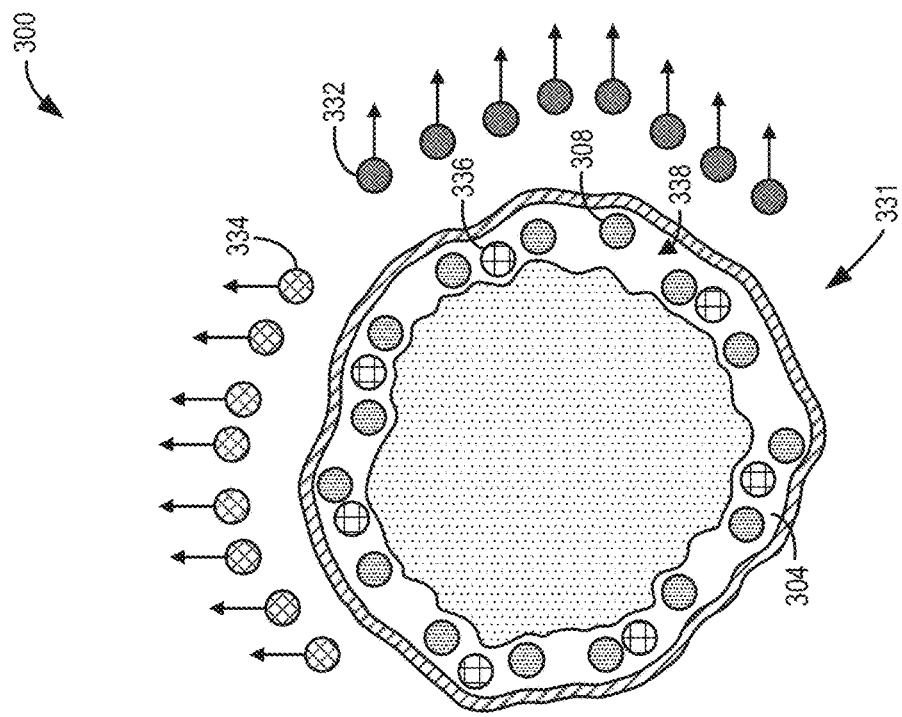
FIG. 3 shows a schematic illustration of a first embodiment of a decomposition of one or more sacrificial lithium source materials present in a coated positive electrode active material.
Figure 3:
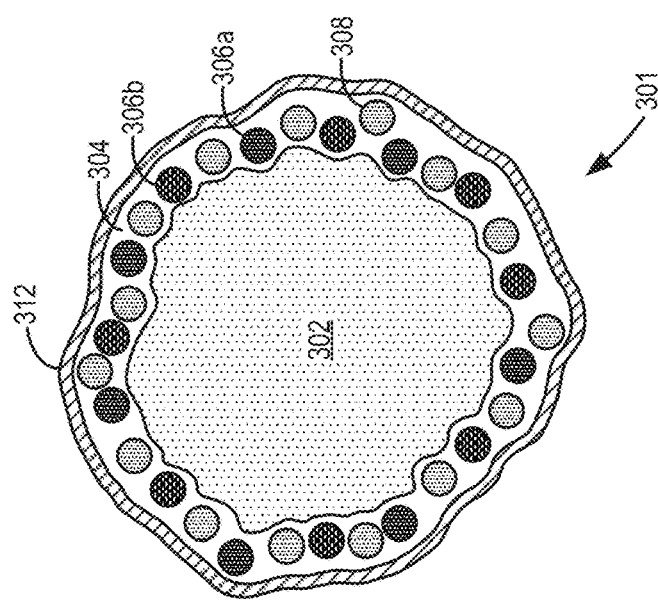
Figure 4:
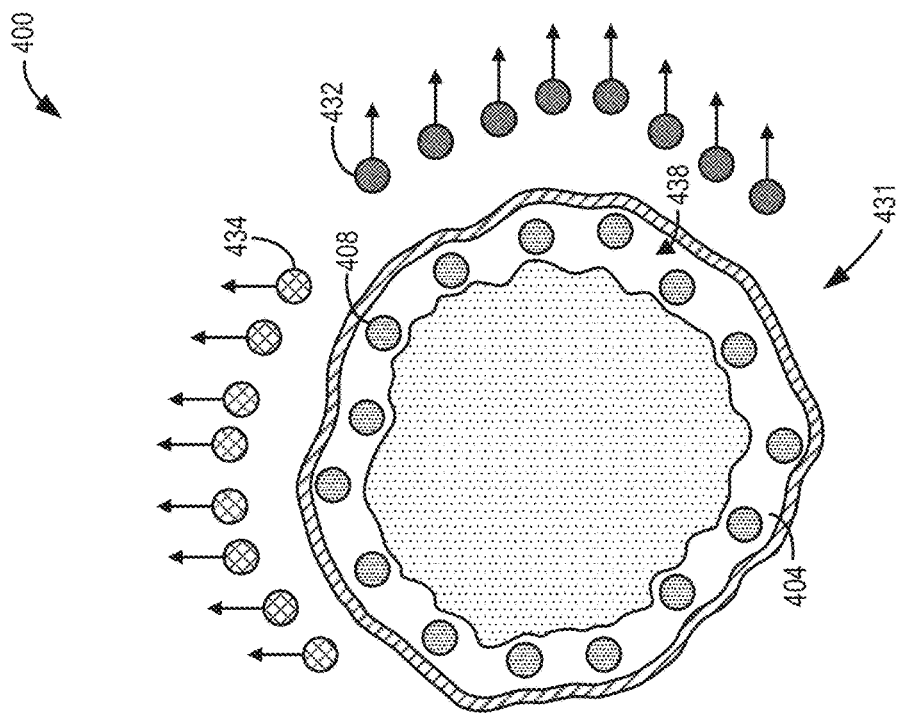
FIG. 4 shows a schematic illustration of a second embodiment of a decomposition of one or more sacrificial lithium source materials present in a coated positive electrode active material.
Figure 4:
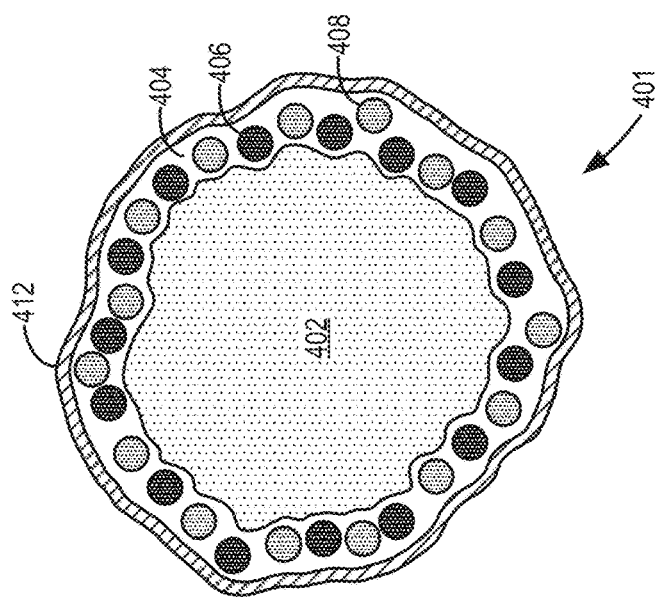
Figure 5:
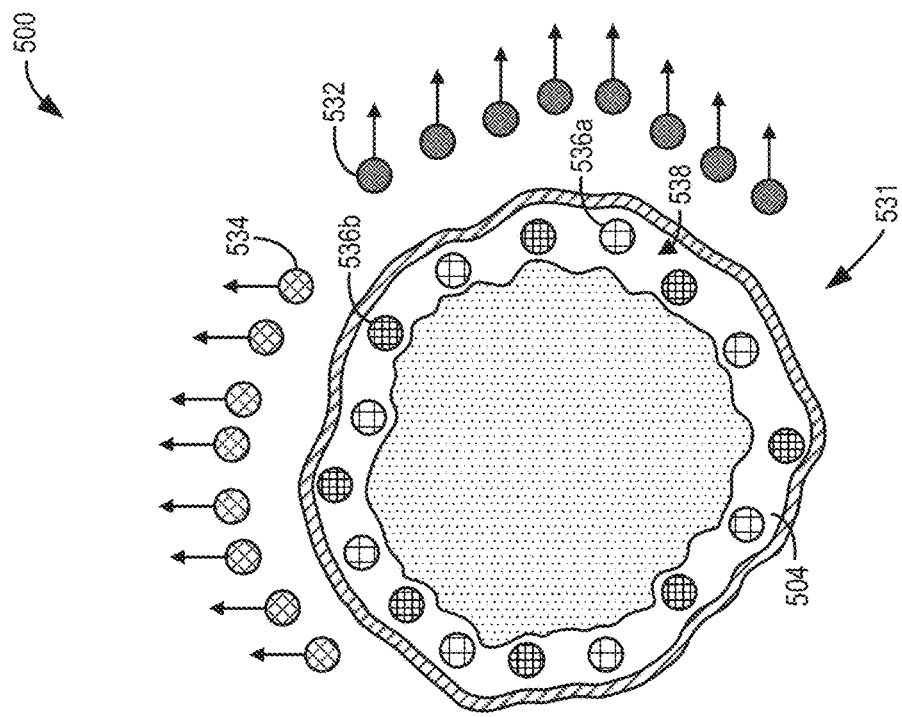
FIG. 5 shows a schematic illustration of a third embodiment of a decomposition of one or more sacrificial lithium source materials present in a coated positive electrode active material.
Figure 5:
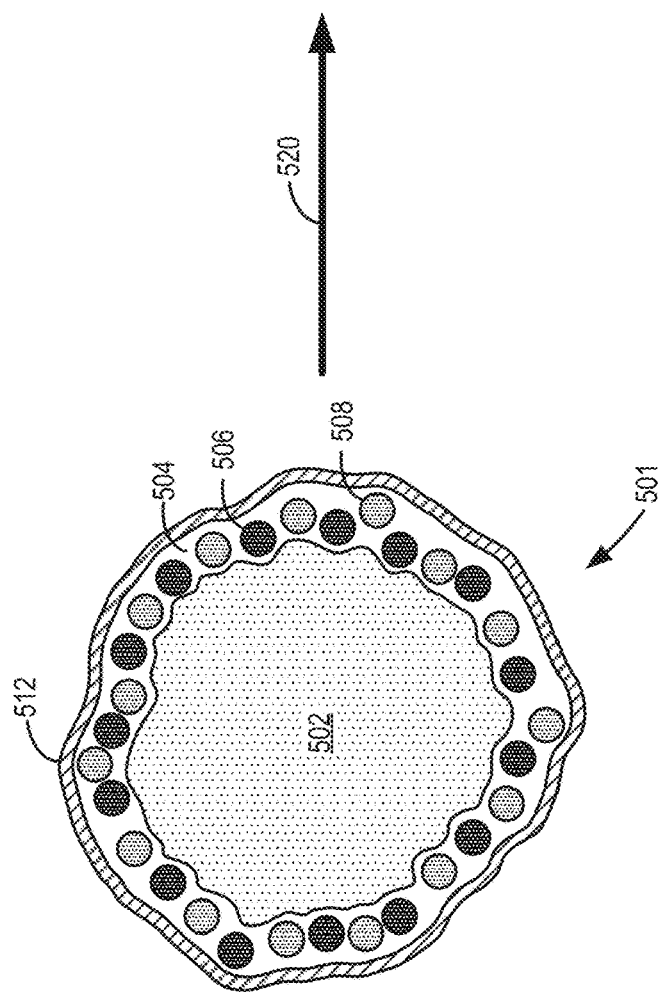

FIGS. 3-5 show embodiments of a decomposition process of sacrificial lithium source particles. FIG. 3 illustrates a catalyzed decomposition process of at least two sacrificial lithium source materials present in a surface coating of a core particle, wherein at least two decomposition products and a residue may be generated. FIG. 4 illustrates a catalyzed decomposition process of a sacrificial lithium source material present in a surface coating of a core particle, wherein at least two decomposition products may be generated. FIG. 5 illustrates a catalyzed decomposition process of a sacrificial lithium source material present in a surface coating of a core particle, wherein at least two decomposition products and a residue may be generated.

Figure 6:
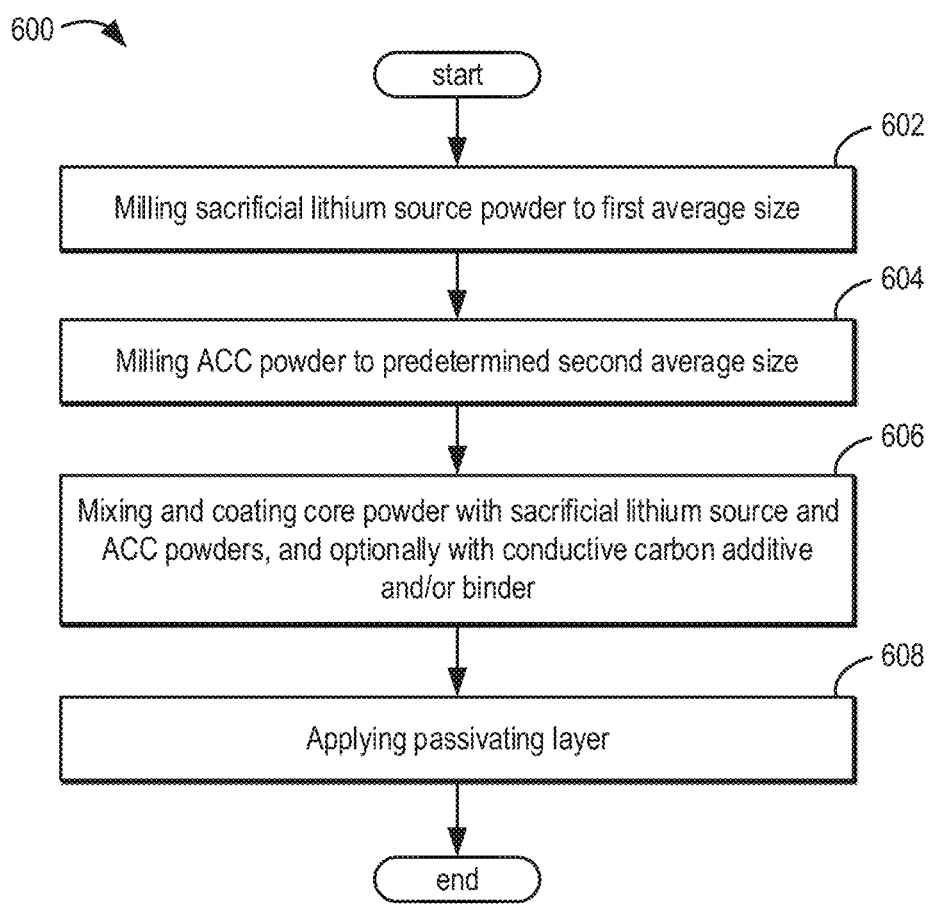
FIG. 6 shows a method for mixing a positive electrode active material powder with sacrificial lithium source and lithium-based active CC (ACC) powders.
Figure 7:
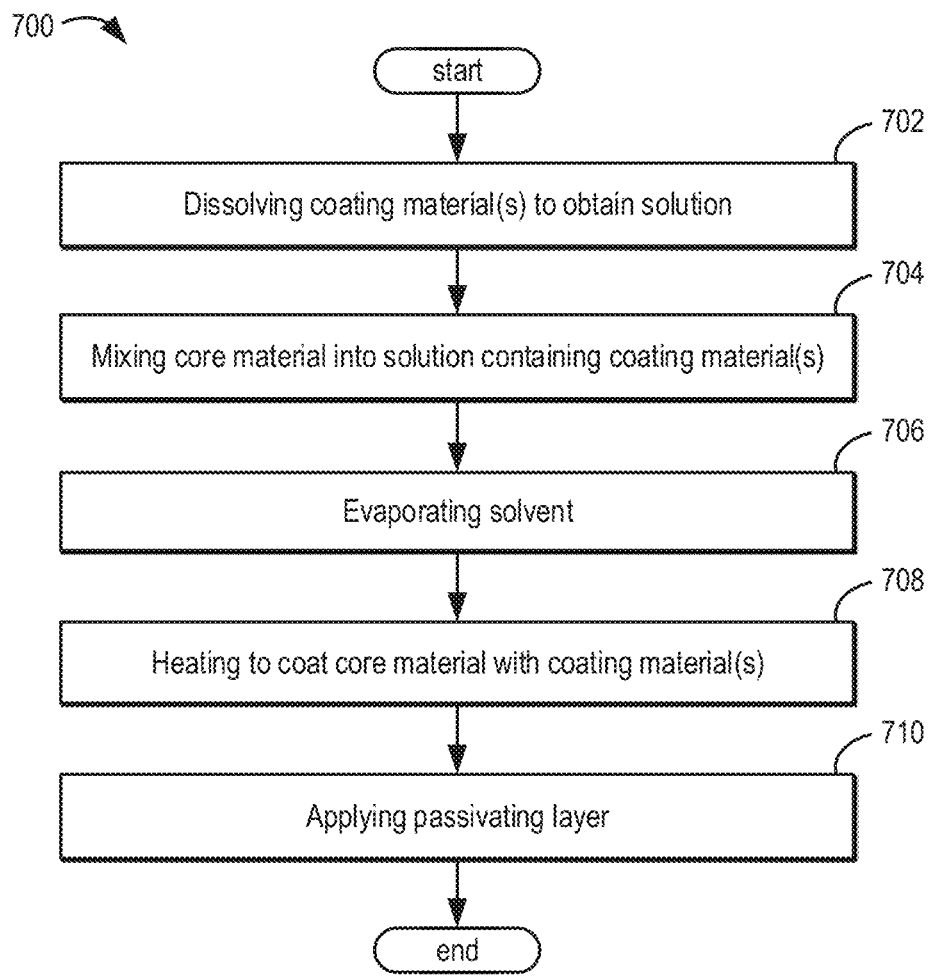
FIG. 7 shows a method for mixing a positive electrode active material with a sacrificial lithium source.
Figure 8:
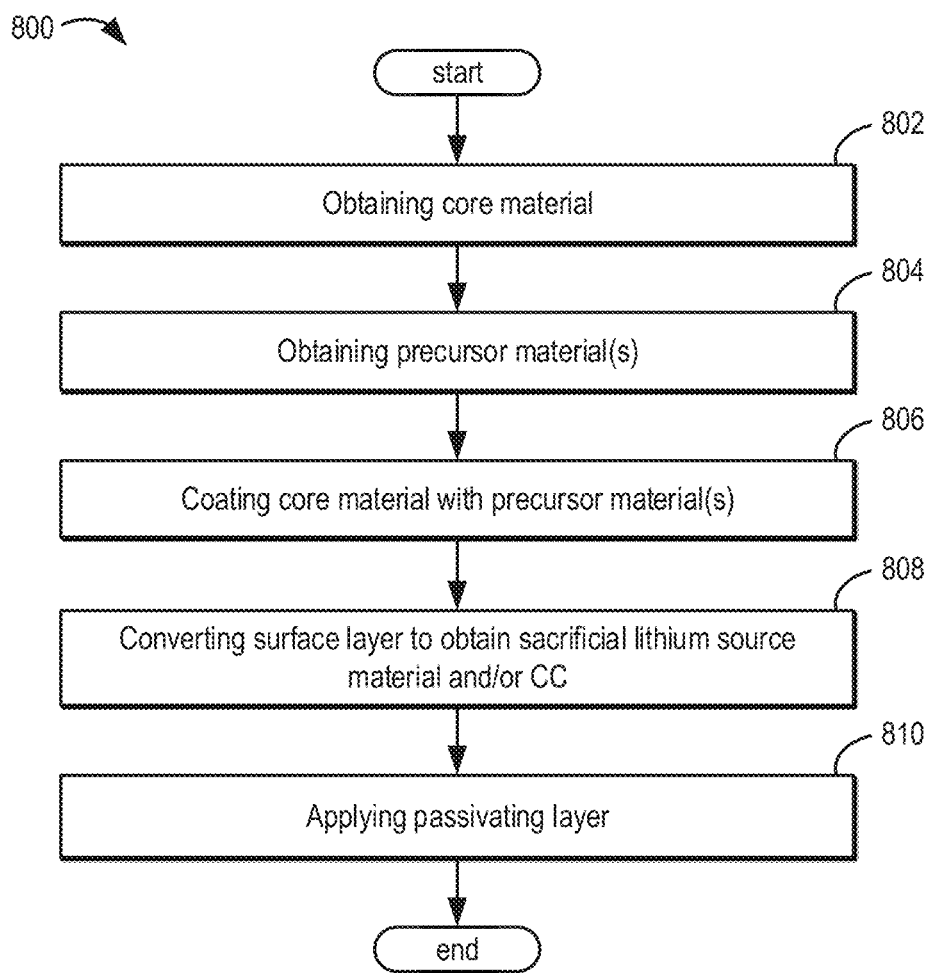
FIG. 8 shows a method for converting a surface layer of a positive electrode active material into a sacrificial lithium source and/or a CC.

FIGS. 6-8 show embodiments of methods of manufacturing coated positive electrode active material particles. FIG. 6 shows a method for applying sacrificial lithium source and active CC (ACC) powders to a core powder, and then applying a passivating layer thereto. FIG. 7 shows a method for applying a surface coating including a sacrificial lithium source material to a core material, and then applying a passivating layer thereto. FIG. 8 shows a method for converting a surface layer of a core material to obtain a sacrificial lithium source material and/or a CC, and then applying a passivating layer thereto.

Figure 9:
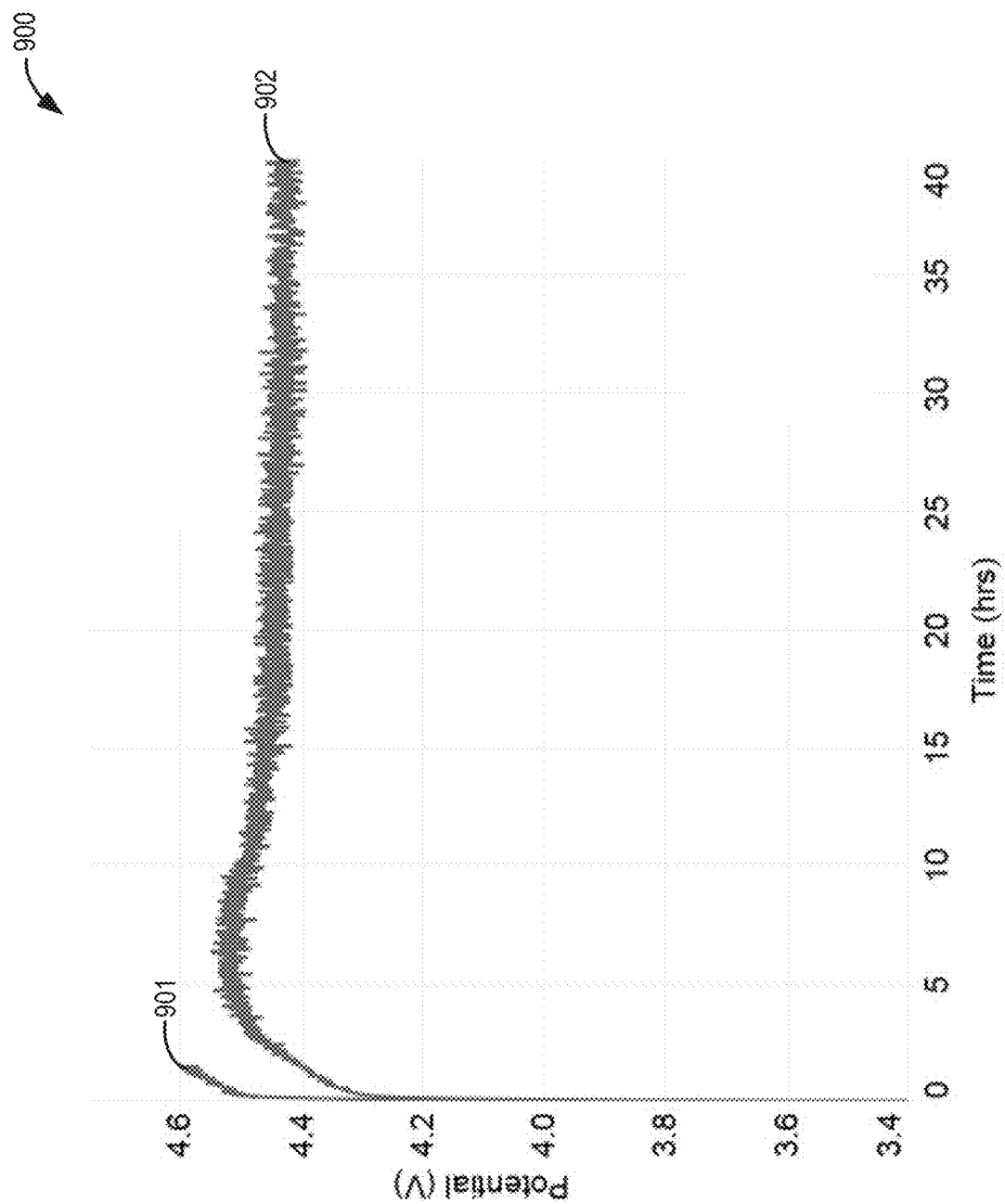
FIG. 9 shows potentials for a lithium ion battery including at least a cathode including a sacrificial lithium source material operating at two charge rates.
Figure 10:
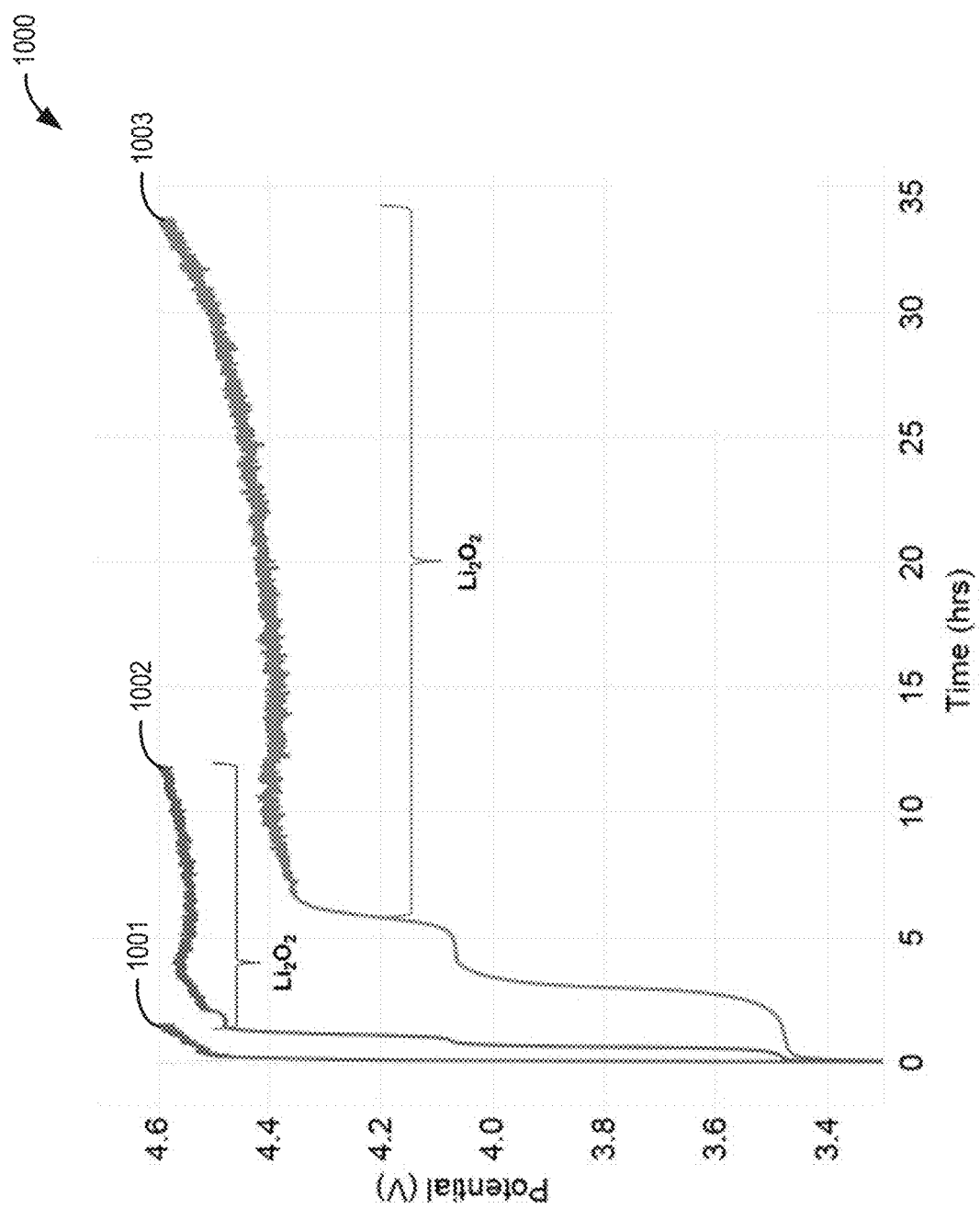
FIG. 10 shows potentials for lithium ion batteries including at least a cathode, wherein each cathode includes a differing ratio of an ACC to a sacrificial lithium source material.

To illustrate a dependence of electrochemical performance on charging rate, potentials are shown in FIG. 9 for a lithium ion battery including at least a cathode including a sacrificial lithium source material, wherein the lithium ion battery is operated at two differing charge rates. Effects of ratios of ACC to sacrificial lithium source material on potentials of lithium ion batteries are shown in FIG. 10.

Figure 11:
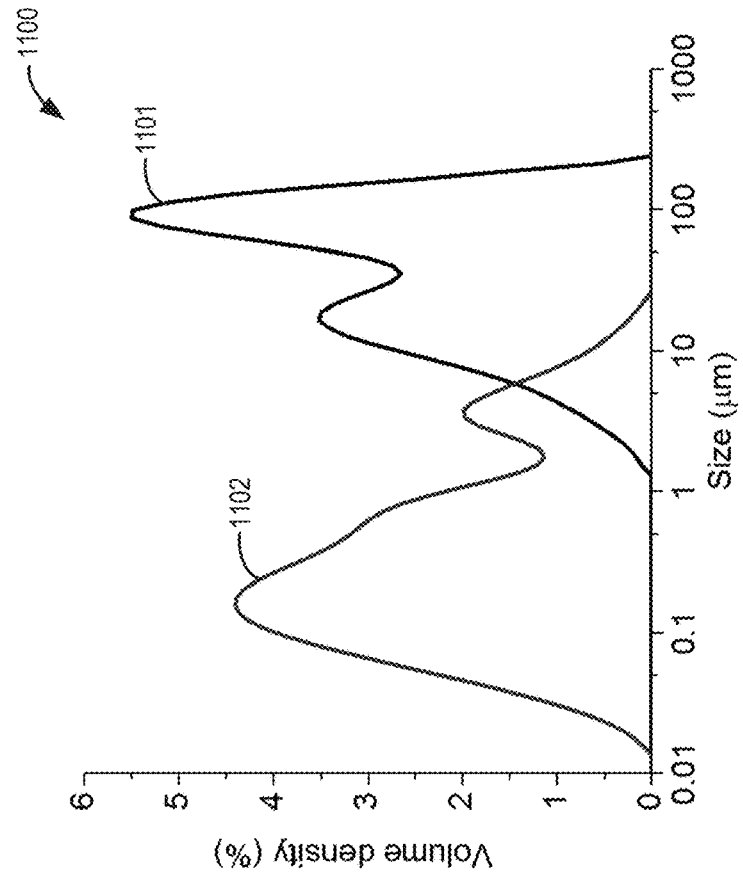
FIG. 11 shows particle size distributions for a lithium peroxide slurry before and after milling.

Particle size distributions (PSDs) for sacrificial lithium source particles prior to and following milling is shown in FIG. 11, as an example of relative size domains employed herein.

Figure 12:
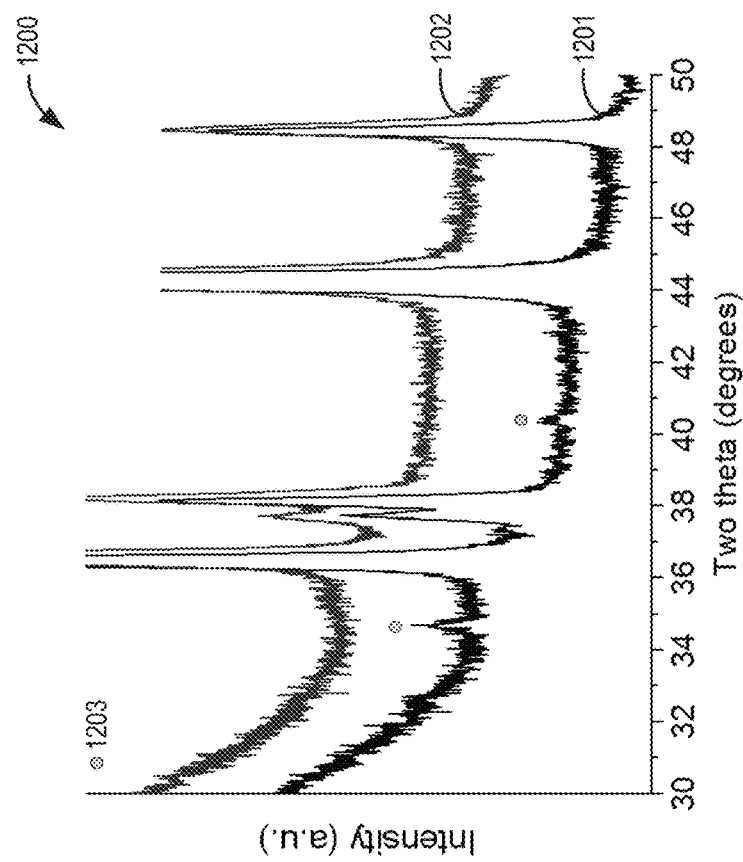
FIG. 12 shows X-ray diffraction (XRD) patterns for each of a pristine cathode and a cathode following cycling.

X-ray diffraction (XRD) patterns illustrating an effect of cycling on composition of cathodes including a sacrificial lithium source material and a CC are shown in FIG. 12.

Figures 13A, 13B, 13C:
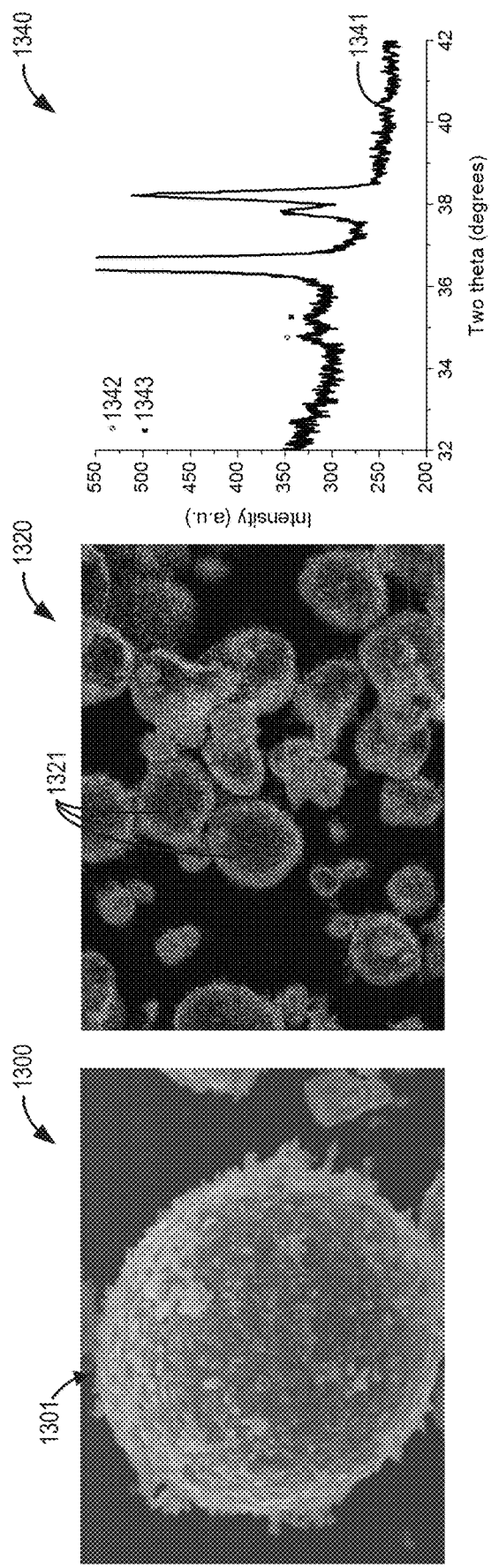
FIG. 13A shows a scanning electron microscope (SEM) image of a coated positive electrode active material particle.
FIG. 13B shows energy dispersive X-ray spectroscopic (EDS) mapping of coated positive electrode active material particles.
FIG. 13C shows a XRD pattern of a coated positive electrode active material.

Scanning electron microscopy (SEM) and XRD characterizations of coated positive electrode active materials are provided at FIGS. 13A-13C. An SEM image of a coated positive electrode active material particle showing distinct morphological coating characteristics is depicted at FIG. 13A. At FIG. 13B, energy dispersive X-ray spectroscopic (EDS) mapping is overlaid onto an SEM image of a plurality of coated positive electrode active material particles. An XRD pattern depicted in FIG. 13C confirms a presence of lithium peroxide and lithium manganese iron phosphate (LMFP) in the coated positive electrode active material particles depicted at FIGS. 13A and 13B.

Figure 14:
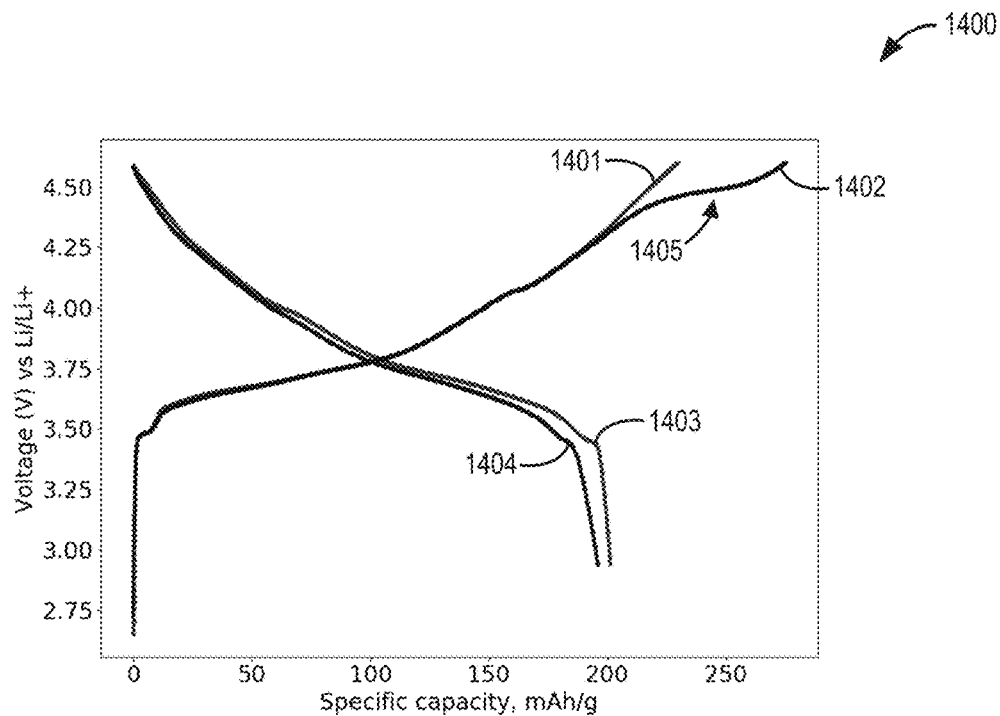
FIG. 14 shows first charge cycle (FCC) voltage profiles for half cells respectively including a cathode having no sacrificial lithium source and a cathode having the sacrificial lithium source.

First charge cycle (FCC) voltage profiles are compared for half cells respectively including a cathode having no sacrificial lithium source and a cathode having the sacrificial lithium source at FIG. 14. Similarly, FCC voltage profiles are compared for full cells respectively including a cathode having no sacrificial lithium source and a cathode having the sacrificial lithium source at FIG. 15. Discharge capacities during an initial four charge cycles of the full cells respectively including the cathode having no sacrificial lithium source and the cathode having the sacrificial lithium source are compared at FIG. 16.

Figure 17A:
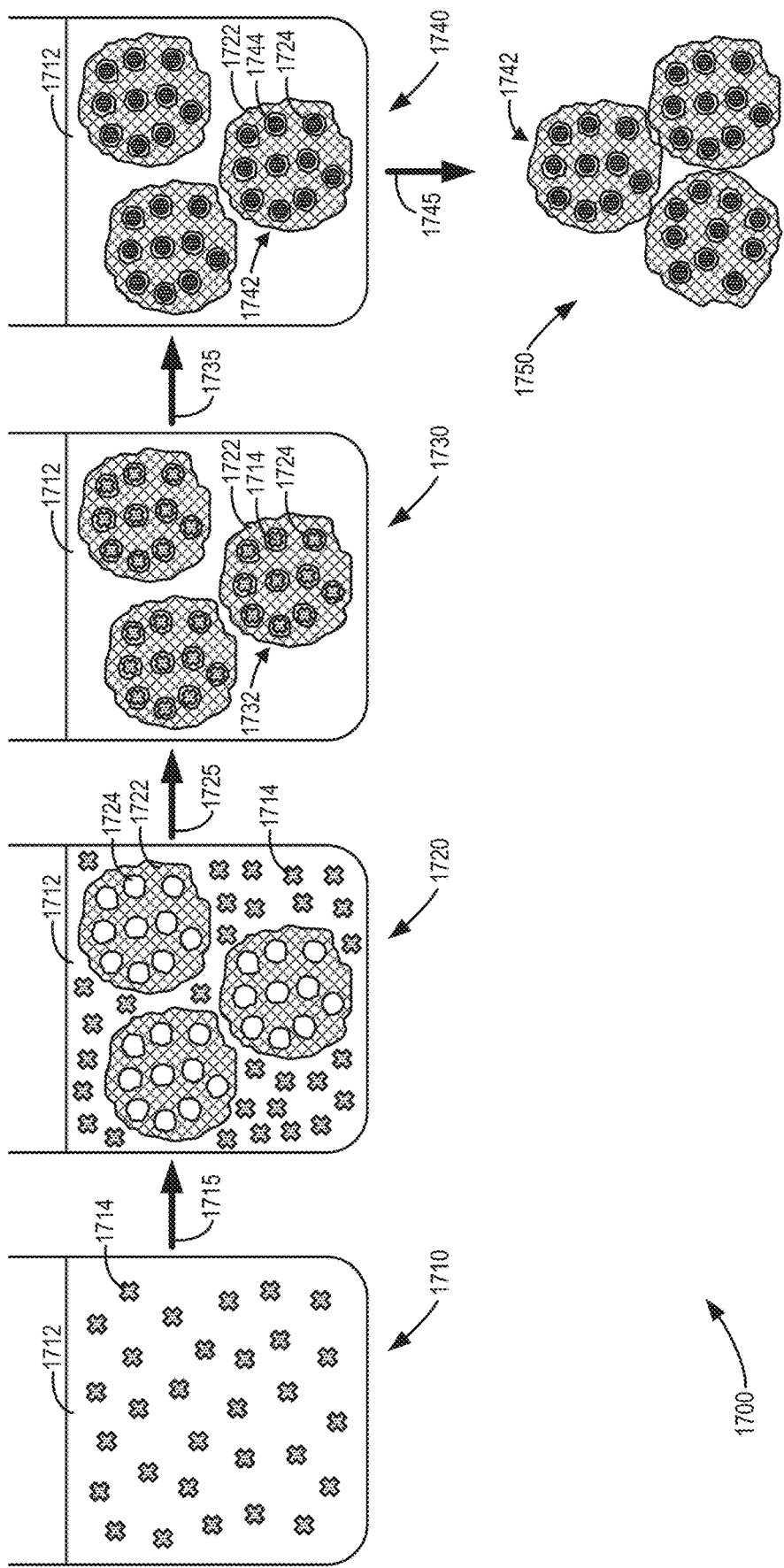
FIG. 17A shows a schematic illustration of a process for impregnating carbon source particles with sacrificial lithium source particles.
Figure 17B:
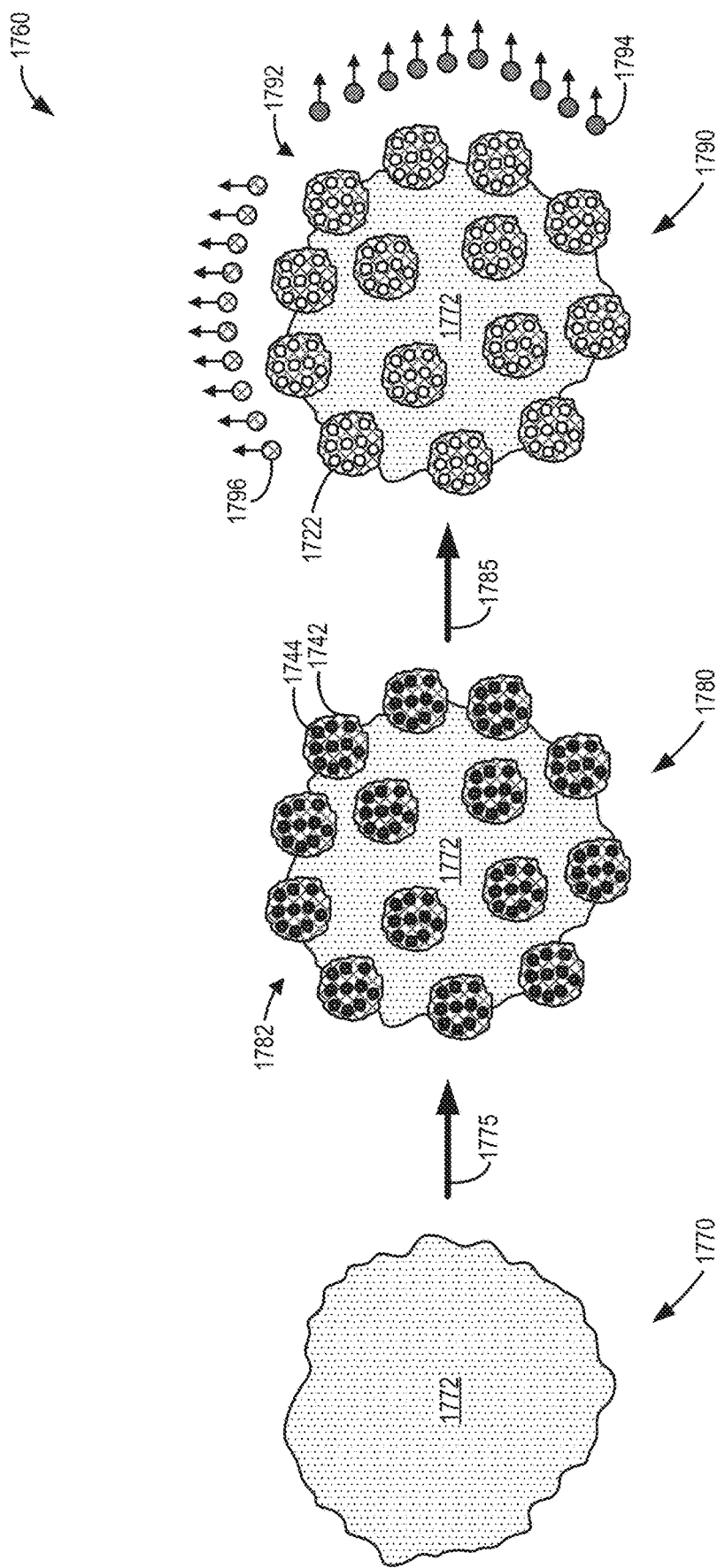
FIG. 17B shows a schematic illustration of a process for coating a positive electrode active material particle with impregnated carbon source particles, followed by a decomposition of sacrificial lithium source particles therein.
Figure 18:
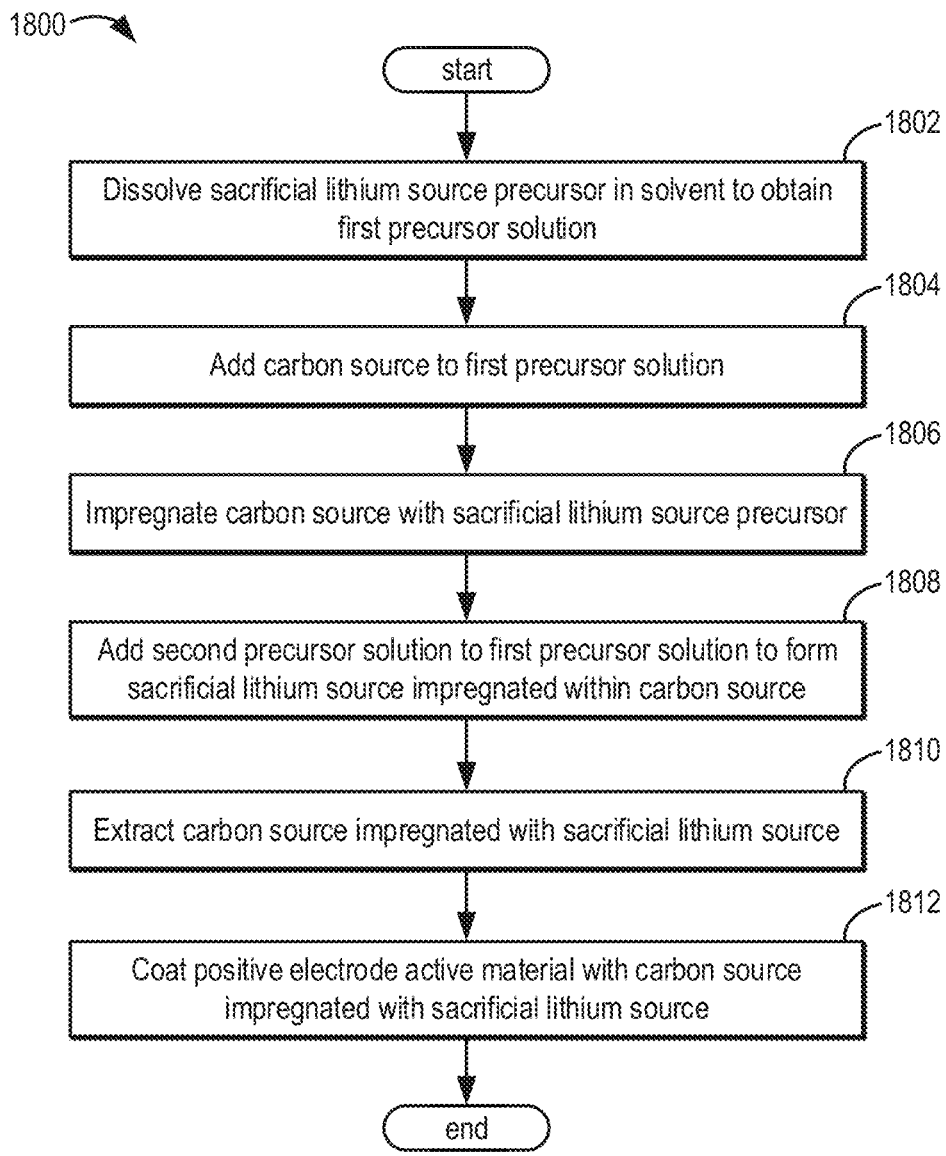
FIG. 18 shows a method for forming a carbon source impregnated with a sacrificial lithium source material, and then coating a positive electrode active material with the impregnated carbon source.

A carbon source, which may include a porous conductive carbon, may be impregnated with a sacrificial lithium source material, such as in the process shown in FIG. 17A and in the method shown in FIG. 18. A positive electrode active material may then be coated with the impregnated carbon source to form a coated positive electrode active material, as is shown in FIG. 17B and in the method shown in FIG. 18. The coated positive electrode active material may then be included in a lithium ion battery, where the sacrificial lithium source material included in the impregnated carbon source may then decompose into one or more decomposition particles, as is further shown in FIG. 17B.

Referring now to FIG. 1, a coated positive electrode active material particle 100 is shown. The coated positive electrode active material particle 100 is schematically illustrated as having a core 102 surrounded by a surface coating 104 and a passivating layer 112.

The core or core particle 102 may be composed of a lithium composite compound. The lithium composite compound may be a LMO, a lithium phosphate compound, or a combination thereof, but is not limited to these types of electrochemically active materials. For example, the core 102 may be a lithium mixed metal oxide layered structured material. In some examples, the lithium composite compound may include one or more metals selected from the group including, but not limited to, Ni, Mn, Co, Al, Mg, Y, Nd, B, Ca, V, Zn, and combinations thereof. In other examples, the one or more metals may be selected from the group including, but not limited to, Ni, Mn, Co, Al, Mg, Y, Nd, B, Ca, V, Zn, Fe, Mg, Ga, Nb, Cr, Mo, W, Tc, Ru, Rh, Ir, Pd, Cu, Ge, Si, In, Ag, Cd, and combinations thereof. In some examples, the lithium composite compound may include a lithium mixed metal oxide. In additional or alternative examples, the lithium mixed metal oxide may include high nickel content. In one example, the lithium mixed metal oxide may include a lithium nickel manganese cobalt oxide (NMC). The NMC may have a structural formula $LiNi_xMn_yCo_{1-x-y}O_2$. Example compositions of the NMC may include one or more of $LiNi_{0.333}Mn_{0.333}Co_{0.333}O_2$ (NMC111), $LiNi_{0.5}Mn_{0.2}Co_{0.3}O_2$ (NMC523), $LiNi_{0.6}Mn_{0.2}Co_{0.2}O_2$ (NMC622), and $LiNi_{0.8}Mn_{0.1}Co_{0.1}O_2$ (NMC811). The NMC may be a single-phase crystal, or the NMC may be polycrystalline or amorphous in form. In other examples, the lithium mixed metal oxide may include a lithium nickel cobalt aluminum oxide (NCA). The NCA may have a structural formula $LiNi_xCo_yAl_{1-x-y}O_2$. In an additional or alternative example, the lithium composite compound may include a lithium phosphate compound, the lithium phosphate compound including one or more metals selected from the group including Fe, V, Mn, and combinations thereof.

In some examples, an average size of the core particles 102 may be at least 1 μm and at most 20 μm. In other examples, the average size of the core particles 102 may be at least 3 μm and at most 20 μm. In further examples, the average size of the core particles 102 may be at least 6 μm and at most 12 μm. In additional or alternative examples, each of the core particles 102 may be of substantially similar size to each of the other core particles 102. In some examples, a relationship between the core particles 102 may be formed such that each core particle 102 may have a similar size. In additional or alternative examples, a core particle size distribution may be a normal distribution. In other examples, the core particle size distribution may be a bimodal distribution. In additional or alternative examples, the core particles 102 may be larger, secondary particles composed of smaller, primary particles. Specifically, each secondary particle may include a plurality of primary particles.

In some examples, the core particle 102 may have a surface including one or more surface structures 110. Such surface structures 110 may be openings or cracks within the surface of the core particle 102. A size and/or depth of the surface structures 110 may vary. Specifically, in some examples, the surface structures 110 may be irregular such that the surface structures 110 may have different shapes and sizes. The surface structures 110 may understandably increase a surface area of the core particle 102.

The core particle 102 may be coated with surface coating 104. The surface coating 104 may provide at least a partial blocking interface such that the entire surface of the core particles 102 may not be fully exposed directly to an electrolyte in a battery. As such, in some examples, the surface coating 104 may completely or substantially completely cover the surface of the core particle 102.

The surface coating 104 may at least include sacrificial lithium source particles 106. Therein, the sacrificial lithium source particles 106 may be in direct contact with one another, or with the core particle 102. The sacrificial lithium source particles 106 may include any material which may undergo a decomposition process with at least a lithium ion product. For example, the sacrificial lithium source particles 106 may include lithium peroxide, lithium aluminum oxide (LAO), lithium iron oxide (LFO), lithium oxide, lithium nitride, lithium sulfide, lithium azide, a conversion-type pre-lithiation reagent, or combinations thereof. In some examples, the sacrificial lithium source particles 106 may include lithium peroxide. In further examples, sacrificial lithium source particles 106 may include a conversion-type pre-lithiation reagent, wherein the conversion-type pre-lithiation reagent may be a blend of one or more metals, such as Co, Fe, Mn, Ni, Cu, Pb, Ru, and Mo, and one or more of $Li_2O$, LiF, and $Li_2S$, such that a conversion reaction may release lithium ions and a corresponding metal compound (e.g., oxides, fluorides, sulfides of the one or more metals). A thorough and sufficient mixing may be required to decrease a voltage of conversion for said conversion reaction to a desired value.

Further, a battery cell may include the coated positive electrode active material particles 100, wherein the sacrificial lithium source particle composition may be lithium peroxide. As described below in reference to FIGS. 3-5, the lithium peroxide may undergo a decomposition process to provide lithium ions to pre-lithiate an anode and to further release oxygen, wherein the oxygen may then be removed from the battery cell. Further, utilizing lithium peroxide as the sacrificial lithium source particle composition may be paired with a CC (e.g., 108) to catalyze the decomposition process, as described herein below. In other words, lithium peroxide may be difficult to decompose without a CC.

In further examples, the sacrificial lithium source particles 106 may include an anti-fluorite structured material, such as LAO and/or LFO. Anti-fluorite structured materials may be employed in some examples as a sacrificial lithium source material over traditional materials, as anti-fluorite structured materials may decompose and release lithium ions more readily at voltages corresponding to practical battery environments as compared to other sacrificial lithium source materials, such as lithium peroxide. For example, in a battery cell operating at a conventional voltage window between 3 V and 4.3 V, anti-fluorite type materials may easily release stored lithium ions and may not accept said lithium ions back upon discharge, thereby providing increased capacity to the battery cell to compensate lithium ion loss during a first charge/discharge cycle. Further, in a battery cell including the coated positive electrode active material particles 100, wherein the sacrificial lithium source composition may be LAO, a CC may not be necessary. Upon a decomposition process of the LAO, lithium ions may be provided to pre-lithiate an anode. Further, residual products from the decomposition process may substantially remain on the surface of the core particle 102 such that an aluminum-containing layer (e.g., from LAO) or an iron-containing layer (e.g., from LFO) may thereby coat the surface of the core particle 102. In examples wherein LAO is employed as the sacrificial lithium source composition, the aluminum-containing layer, which may include aluminum oxide or alumina or $Al_2O_3$, may further provide safety enhancements and stabilized cycling to the battery cell.

The sacrificial lithium source particles 106 may have a substantially similar or smaller average size than the average size of the core particles 102. In some examples, a relationship between the core particles 102 and the sacrificial lithium source particles 106 may be formed such that each of the sacrificial lithium source particles 106 may be smaller than each of the core particles 102. The sacrificial lithium source particles 106 may have an average size of at most 1 µm. In some examples, the average size of the sacrificial lithium source particles 106 may range between 0.01 µm to 1 µm. In other examples, the average size of the sacrificial lithium source particles 106 may range between 0.1 µm to 1 µm. In other examples, the average size of the sacrificial lithium source particles 106 may range between 0.3 µm to 1 µm. In other examples, the average size of the sacrificial lithium source particles 106 may range between 0.1 µm to 0.5 µm. In other examples, the average size of the sacrificial lithium source particles 106 may range between 0.1 µm to 0.3 µm. In other examples, the average size of the sacrificial lithium source particles 106 may range between 0.5 µm to 1 µm. In further examples, the sacrificial lithium source particles 106 may be nanoscale (e.g., the average size of the sacrificial lithium source particles 106 may be less than 1 µm). In additional or alternative examples, each of the sacrificial lithium source particles 106 may be of substantially similar size to each of the other sacrificial lithium source particles 106. In some examples, a relationship between the sacrificial lithium source particles 106 may be formed such that each sacrificial lithium source particle 106 may have a similar size. In additional or alternative examples, a sacrificial lithium source PSD may be a normal distribution. In additional or alternative examples, the sacrificial lithium source PSD may be a bimodal distribution.

The surface coating 104 may further include CC particles 108. The CC particles 108 may include any material which catalyzes a decomposition process of the sacrificial lithium source particles 106. As such, the CC particles 108 may be simultaneously coated onto the core particle 102 with the sacrificial lithium source particles 106. Therein, the CC particles 108 may be in direct contact with one another, with the sacrificial lithium source particles 106, and/or with the core particle 102. The CC particles 108 may include any material which may not be consumed during a first charge cycle. In some examples, the CC particles 108 may include a lithium-based ACC, wherein the ACC may be any lithium compound which reversibly releases and accepts lithium ions during a charge cycle and catalyzes a decomposition process of the sacrificial lithium source particles 106. In some examples, the CC particles 108 may include other catalytic materials which may not contribute to a specific capacity of a cathode in which the CC particles 108 may be incorporated. In some examples, the CC particles 108 may function as a secondary sacrificial lithium source. Further, the CC particles 108 may be a compound including a transition metal with partially-populated d and/or f orbitals, which may instigate electronic transitions and lower an activation energy for the decomposition process of the sacrificial lithium source particles 106. The ACC may act as the catalyst before releasing Li during the charge process, or act as the catalyst after partially or fully releasing Li during the charge process. In the latter case, a delithiated homolog of the ACC (which may have a different chemical formula and/or structure) may be considered the actual CC that catalyzes the reaction of the sacrificial Li source decomposition. For example, the CC particles 108 may include LMFP, lithium iron phosphate (LFP), lithium vanadium fluorophosphate (LVFP), NMC, NCA, LAO, LFO, or combinations thereof. For example, and not as a limitation, the NMC may be NMC111, NMC523, NMC622, NMC811, or a combination thereof. Further, the NMC may be a single-phase crystal, or the NMC may be polycrystalline or amorphous in form. In some examples, the CC particles 108 may be composed of only one chemical composition. In additional or alternative examples, the CC particles 108 may include a metal oxide, such as cobalt tetraoxide ($Co_3O_4$). In additional or alternative examples, a composition of the CC particles 108 and the core particles 102 may be indistinguishable, such that each of the CC particles 108 and the core particles 102 are of like chemical composition. For example, the core particles 102 may include a lithium mixed metal oxide and the CC particles 108 may include a lithium mixed metal oxide, wherein the lithium mixed metal oxide of the core particles 102 may be the lithium mixed metal oxide of the CC particles 108. In additional or alternative examples, a composition of the CC particles 108 and the core particles 102 may be different. For example, the core particles 102 may include a lithium mixed metal oxide and the CC particles 108 may include a lithium mixed metal oxide, wherein the lithium mixed metal oxide of the core particles 102 may be different than the lithium mixed metal oxide of the CC particles 108.

Further, a battery cell may include the coated positive electrode active material particles 100 including the sacrificial lithium source particles 106 and the CC particles 108, wherein the CC particle composition may be one or more of LMFP, LFP, LVFP and LAO. The CC particles 108 may catalyze the decomposition process of the sacrificial lithium source particles 106. Further, the CC particles 108 may also decompose during catalysis. In such examples, the CC particles 108 may either act as a catalyst before or after decomposition. In the case that CC particles 108 act as a catalyst after decomposition, the actual CC may be a decomposition product from the decomposition reaction of the CC particles 108. Residual products originating from the sacrificial lithium source particles 106 and/or the CC particles 108 may substantially remain on the surface of the core particle 102 such that a residue layer may thereby coat the surface of the core particle 102. The residue layer may further provide safety enhancements, improved capacity, and stabilized cycling to the battery cell. Further improvements to a first-cycle discharge capacity (FDC) and cycling performance of the battery cell ascribed to pre-lithiation of the anode may thus provide dual performance benefits when paired with the residue layer described above. In examples wherein the CC particles 108 include LAO, the decomposition process of the CC particles 108 may leave behind an aluminum-containing residue, such as aluminum oxide or alumina or $Al_2O_3$, which is known to those skilled in the art to confer safety and performance benefits to the battery.

It should be understood that the LAO is typically considered as a sacrificial lithium source. However, in some example configurations, LAO may also function as the CC. For example, the CC particles 108 may include LAO and the sacrificial lithium source particles 106 may include lithium peroxide. With such example configurations, the CC particles 108, being LAO, may contribute lithium ions for pre-lithiation of the anode, while still providing the benefits ascribed above to the aluminum-containing residue. It will be appreciated that other LMOs (e.g., LFO) may additionally or alternatively be employed as an active material, sacrificial lithium source, and/or a CC.

In examples wherein the CC particles 108 include LMFP or LVFP and the core particles 102 include NMC, the battery may not have a significant decrease in cycling stability and may have improved safety performance and capacity. As such, an energy density decrease ascribed to a presence of CC particles 108 may be mitigated via performance benefits such as improved capacity. Specifically, CC particles 108 with compositions such as LMFP or LVFP may release and accept lithium ions during a battery operating voltage range such that the CC particles 108 may simultaneously function as an active component of the battery.

The CC particles 108 may have a substantially similar or smaller average size than the average size of the sacrificial lithium source particles 106. In some examples, a relationship between the sacrificial lithium source particles 106 and the CC particles 108 may be formed such that each of the CC particles 108 may be smaller than each of the sacrificial lithium source particles 106. Further, the CC particles 108 may have a substantially similar or smaller average size than the average size of the core particles 102. In some examples, a relationship between the core particles 102 and the CC particles 108 may be formed such that each of the CC particles 108 may be smaller than each of the core particles 102. The CC particles 108 may have an average size of at most 5 μm. In some examples, the average size of the CC particles 108 may be at most 1 μm. In other examples, the average size of the CC particles 108 may range between 0.01 μm to 1 μm. In other examples, the average size of the CC particles 108 may range between 0.1 μm to 1 μm. In other examples, the average size of the CC particles 108 may range between 0.3 μm to 1 μm. In other examples, the average size of the CC particles 108 may range between 0.5 μm to 1 μm. In other examples, the average size of the CC particles 108 may range between 0.1 μm to 0.5 μm. In other examples, the average size of the CC particles 108 may range between 0.1 μm to 0.4 μm. In further examples, the CC particles 108 may be nanoscale (e.g., the average size of the CC particles 108 may be less than 1 μm). In additional or alternative examples, each of the CC particles 108 may be of substantially similar size to each of the other CC particles 108. In some examples, a relationship between the CC particles 108 may be formed such that each CC particle 108 may have a similar size. In additional or alternative examples, a CC PSD may be a normal distribution. In additional or alternative examples, the CC PSD may be a bimodal distribution.

The sacrificial lithium source particles 106 and/or CC particles 108 may be retained in position via van der Waals molecular forces and/or mechanical forces with one another and/or with the core particle 102 and the surface structures 110 thereon. Additionally or alternatively to said van der Waals molecular and/or mechanical forces, a greater force may be employed, for example, via a heating or an annealing process. The greater force may include one or more of hydrogen bonding, ionic bonding, covalent bonding, etc. In some examples, the greater force may include bonding or annealing to a binder. The binder may be disposed between the core particle 102, the sacrificial lithium source particles 106, the CC particles 108, and/or the passivating layer 112. In some examples, the binder may be a polymer, such as polyvinylidene fluoride (PVDF), polyvinyl pyrrolidone (PVP), poly(ethylene oxide) (PEO), or a polyimide (PI). In examples where the binder included in the surface coating 104 is PVDF, the PVDF may gel and facilitate formation of a three-dimensional structural network by fixing the sacrificial lithium source particles 106 and/or the CC particles 108 in place, thereby further strengthening the surface coating 104. It will be appreciated that the beneficial effects ascribed to PVDF within the surface coating 104 may contrast with inclusion of PVDF as a separate binder between coated positive electrode active material particles 100 in a finally-formed cathode slurry, as gelation may not be desirable during manufacture of the cathode slurry.

In some examples, the surface coating 104 includes each of the sacrificial lithium source particles 106 and the CC particles 108. In some examples, there may be more sacrificial lithium source particles 106 by weight than CC particles 108. As such, a minimum amount of CC particles 108 necessary for catalysis of a decomposition process of the sacrificial lithium source particles 106 may be selected. In some examples, there may be no, or substantially no, CC particles 108 present. In other examples, a weight ratio of the sacrificial lithium source particles 106 to the CC particles 108 may be about 100:1, 50:1, 20:1, 15:1, 10:1, 9:1, 8:1, 7:1, 6:1, 5:1, 4:1, 3:1, 2:1, or 1.5:1. In some examples, the weight ratio of the sacrificial lithium source particles 106 to the CC particles 108 may be about 1:1, such that the sacrificial lithium source particles 106 may be present in a substantially equal amount to the CC particles 108. When the weight ratio of the sacrificial lithium source particles 106 to the CC particles 108 is about 1:1, each of the average size and a surface area of the CC particles 108 may be substantially similar to each of the average size and a surface area of the sacrificial lithium source particles 106, respectively. In some examples, there may be more CC particles 108 by weight than sacrificial lithium source particles 106. As such, a voltage required for a decomposition process of the sacrificial lithium source particles 106 may be lowered. In some examples, the weight ratio of the sacrificial lithium source particles 106 to the CC particles 108 may be about 1:0.5, 1:1, 1:2, 1:3, 1:4, 1:5, 1:6, 1:7, 1:8, 1:9, 1:10, 1:15, 1:20, 1:50, or 1:100. As such, in some examples, the weight ratio of the sacrificial lithium source particles 106 to the CC particles 108 may be between 100:1 and 1:100. In further examples, the weight ratio may be between 50:1 and 1:50. In further examples, the weight ratio may be between 20:1 and 1:20. In further examples, the weight ratio may be between 15:1 and 1:15. In further examples, the weight ratio may be between 10:1 and 1:10. In further examples, the weight ratio may be between 9:1 and 1:9. In further examples, the weight ratio may be between 8:1 and 1:8. In further examples, the weight ratio may be between 7:1 and 1:7. In further examples, the weight ratio may be between 6:1 and 1:6. In further examples, the weight ratio may be between 5:1 and 1:5. In further examples, the weight ratio may be between 4:1 and 1:4. In further examples, the weight ratio may be between 3:1 and 1:3. In further examples, the weight ratio may be between 2:1 and 1:2. In further examples, the weight ratio may be between 1.5:1 and 1:1.5. In further examples, the weight ratio may be between about 1.5:1 and about 1:4. In further examples, the weight ratio may be between about 1:0.7 and about 1:4. In one example, the CC particles 108 may be LMFP and the weight ratio of the sacrificial lithium source particles 106 to the CC particles 108 may be 1:4. In another example, the CC particles may be $Co_3O_4$ and the weight ratio of the sacrificial lithium source particles 106 to the CC particles 108 may be 1.5:1. Further, the weight ratio of the sacrificial lithium source particles 106 to the CC particles 108 may be based on an anode composition and/or an extent of irreversible capacity loss necessary to compensate.

The surface coating 104 may be present within the active material at greater than 0% by weight and less than 50% by weight. In some examples, the surface coating 104 may be present within the active material at greater than 0.1% by weight and less than 50% by weight. In other examples, the surface coating 104 may be present within the active material at greater than 0.1% by weight and less than 30% by weight. In other examples, the surface coating 104 may be present within the active material at greater than 0.1% by weight and less than 10% by weight. In other examples, the surface coating 104 may be present within the active material at greater than 0.1% by weight and less than 5% by weight.

In some examples, the sacrificial lithium source particles 106 and/or CC particles 108 may adhere to and/or within the surface structures 110 via van der Waals molecular forces and/or mechanical forces. As such, a size of each of the sacrificial lithium source particles 106 and/or CC particles 108 may be complementary to a size of reciprocal surface structures 110 such that the sacrificial lithium source particles 106 and/or CC particles 108 may be partially secured therein. In some examples, the sacrificial lithium source particles 106 and/or CC particles 108 may be milled to a preselected average size. The preselected average size of the sacrificial lithium source particles 106 and/or CC particles 108 results in the retention of said particles on and partially within surface structures 110 of complementary size on the surface of the core particle 102. In other examples, the sacrificial lithium source particles 106 and/or CC particles 108 may have substantially different sizes such that said particles may be retained in matching-sized reciprocal surface structures 110.

The surface coating 104 may be composed of a high density of the sacrificial lithium source particles 106 and/or CC particles 108 such that the surface coating 104 may be considered to be uniform and continuous. Further, the surface coating 104 may vary in thickness depending upon the position of the sacrificial lithium source particles 106 and/or CC particles 108 on or within the surface of the core particle 102. In some examples, the thickness may be considered, at maximum, the approximate size of sacrificial lithium source particles 106 and/or CC particles 108. In other words, the sacrificial lithium source particles 106 and CC particles 108, alone or in combination, may be arranged as a single layer, where a greatest thickness of the surface coating 104 of the core particles 102 may correspond to a largest particle size of the sacrificial lithium source particles 106 and/or CC particles 108.

In other examples, the surface coating 104 may be multiple layers thick. For example, in some embodiments, multiple layers of the surface coating 104 may exist at the surface of the core particles 102. The thickness of the surface coating 104 may be no more than about 3 particles thick, wherein said particles may include the sacrificial lithium source particles 106 and/or CC particles 108. In additional or alternative examples, the thickness of the surface coating 104 may be no more than 3 μm thick.

The surface coating 104 may be applied to the core particles 102 by a number of methods (as described below in reference to FIGS. 6-8). In some methods, one or more properties of the core particles 102, sacrificial lithium source particles 106, and/or CC particles 108 may be selectively controlled based upon method of preparation. For example, each of the average sizes of the sacrificial lithium source particles 106 and/or CC particles 108 may be optimized so as to obtain optimal electrochemical performance.

The surface coating 104 may be further coated with passivating layer 112, such that the surface coating 104 may be disposed between the core particle 102 and the passivating layer 112. The passivating layer 112 may be selected such that the passivating layer 112 may not dissolve in processing and electrolytic solvents. Further, the passivating layer 112 may be selected to be ionically and electrically conductive. For example, the passivating layer 112 may include a polymer, carbon, ceramic, zeolite, or hybrid coating. In some examples, the passivating layer 112 may be a polymer selected such that the polymer may partially or completely dissolve in an electrolytic solvent. In some examples, the polymer coating may be of low molecular weight, such as less than 100,000 Da, and may be applied at a low concentration. In additional or alternative examples, the polymer coating may include an ionically conductive polymer such as a poly(3,4-ethylenedioxythiophene) polystyrene sulfonate (PEDOT:PSS), crosslinked polyethylene glycol, crosslinked polyvinyl alcohol, PI, sodium carboxymethyl cellulose, sodium polyacrylate, or a combination thereof. In additional or alternative examples, the polymer coating may include polymethyl methacrylate (PMMA), PEO, or a combination thereof. The polymer coating may improve the FCE of the battery cell, but the polymer may further decrease a conductivity of the coated positive electrode active material particle 100. As such, highly-structured and/or conductive carbon may be included in a composite, or hybrid, coating. In some examples, the conductive carbon may include one or more of vapor grown carbon fibers and Super P™. In one example, an easily-dispersed conductive carbon such as Super P™ may be selected in order to ensure a percolation network. In additional or alternative examples, the carbon coating may be amorphous in form. Further, the carbon coating may incorporate metal acetylides wherein the metal may be, for example, and not as a limitation, one or more of Cu, Al, Mg, Mn, Ni, and Co, and wherein the metal may be selected on a basis of optimal electrical conductivity and thermal stability. The metal may further be selected so as to be compatible with voltage limits of a battery cell incorporating coated positive electrode active material particles 100. In additional or alternative examples, the zeolite coating may have highly stable structure and controllable pore sizes. Further, the zeolite coating may provide a catalytic benefit. The carbon coating may include graphene (hydrophobic) nanoplatelets in a wrapped-layer structure, which may be selectively permeable to allow transfer of $O_2$ and act as a barrier to moisture. Such a graphene coating may also improve conductivity. In some examples, the passivating layer 112 may be achieved with high energy mechanical mixing without an additional binder.

The passivating layer 112 may have a thickness of at most 1 μm. In some examples, the thickness of the passivating layer 112 may range from 0.1 μm to 1 μm. In other examples, the thickness of the passivating layer 112 may range from 0.3 μm to 1 μm. In other examples, the thickness of the passivating layer 112 may range from 0.5 μm to 1 μm. In other examples, the thickness of the passivating layer 112 may range from 0.1 μm to 0.5 μm. In other examples, the thickness of the passivating layer 112 may be less than 0.1 μm.

The passivating layer 112 may uniformly, continuously, and conformally coat the surface coating 104 such that the surface coating 104 may be considered completely covered by the passivating layer 112. In additional or alternative examples, the passivating layer 112 may include particulates which discretely coat the surface coating 104. In this manner, the passivating layer 112 may function as a shield, such that the passivating layer 112 may mitigate undesired side reactions between the core particles 102, sacrificial lithium source particles 106, and/or CC particles 108 in a battery and an electrolyte in the battery. Further, the passivating layer 112 may protect the core particles 102, sacrificial lithium source particles 106, and/or CC particles 108 from air and/or moisture, such that the coated positive electrode active material particles 100 may be stable in air and/or moisture. Of particular benefit, the passivating layer 112 may be semi-permeable such that the passivating layer 112 may allow certain chemical compounds, such as lithium ions and oxygen, to pass from within the passivating layer 112 to outside the passivating layer 112 while still substantially protecting and retaining other chemical compounds or nanoscale particles thereof inside of the passivating layer 112. Further, a passivating layer composition may provide greater efficiency and conductivity of the coated positive electrode active material particles 100 at an interface with the electrolyte in the battery. As such, the surface coating 104 in combination with the passivating layer 112 may provide significant advantages over standard slurry coatings, wherein there may be no control in processing to prevent undesired side reactions with water contaminants. Further, significant costs may be avoided from atmospheric control via vacuum, inert gas, or transfer systems in manufacturing such standard configurations.

Referring now to FIG. 2, a coated positive electrode active material particle 200 is shown. As such, the coated positive electrode active material particle 200 may include a core particle 202. The core particle 202 may be core particle 102 of FIG. 1.

The core particle 202 may have a surface coating 204, wherein the surface coating 204 may include one or more of sacrificial lithium source particles 206, CC particles 208, and binder 211. The sacrificial lithium source particles 206 and the CC particles 208 may be sacrificial lithium source particles 106 and CC particles 108 of FIG. 1, respectively. The surface coating 204 is shown in FIG. 2 being materials and features disposed between a surface of the core particle 202 and a maximum extent 205, wherein the maximum extent 205 is shown by a dashed line. The surface coating 204 may be one or more embodiments of surface coating 104 of FIG. 1. For example, the sacrificial lithium source particles 206 and/or CC particles 208 may be retained in position via van der Waals molecular forces and/or mechanical forces with one another and/or with the core particle 202 and the surface structures 210 thereon. Additionally or alternatively to said van der Waals molecular and/or mechanical forces, a greater force may be employed, for example, via a heating or an annealing process. The greater force may include one or more of hydrogen bonding, ionic bonding, covalent bonding, etc.

In some examples, the greater force may include bonding or annealing to the binder 211. The binder 211 may be disposed between the core particle 202, the sacrificial lithium source particles 206, and/or the CC particles 208 such that the surface coating 204 may be formed on said core particle 202. In some examples, the binder may be a polymer which may be soluble in an organic solvent, such as N-2-methyl-pyrrolidone (NMP). The binder 211 may include, for example, PVDF, PVP, PEO, a cellulosic derivative, or a linear, semi-aromatic, or aromatic PI. In one example, the binder 211 may include an aromatic polyimide which is crosslinkable via heat treatment at around 350° C. As such, the binder 211 may confer increased partial electrical conductivity to a battery incorporating coated positive electrode active material particles 200.

In some examples, the surface coating 204 includes each of the sacrificial lithium source particles 206 and the CC particles 208. In some examples, there may be more sacrificial lithium source particles 206 by weight than CC particles 208. As such, a minimum amount of CC particles 208 necessary for catalysis of a decomposition process of the sacrificial lithium source particles 206 may be selected. In some examples, there may be no or substantially no CC particles 208 present. In other examples, a weight ratio of the sacrificial lithium source particles 206 to the CC particles 208 may be about 100:1, 50:1, 20:1, 15:1, 10:1, 9:1, 8:1, 7:1, 6:1, 5:1, 4:1, 3:1, 2:1, or 1.5:1. In some examples, the weight ratio of the sacrificial lithium source particles 206 to the CC particles 208 may be about 1:1, such that the sacrificial lithium source particles 206 may be present in a substantially equal amount to the CC particles 208. When the weight ratio of the sacrificial lithium source particles 206 to the CC particles 208 is about 1:1, each of the average size and a surface area of the CC particles 208 may be substantially similar to each of the average size and a surface area of the sacrificial lithium source particles 206, respectively. In some examples, there may be more CC particles 208 by weight than sacrificial lithium source particles 206. As such, a voltage required for a decomposition process of the sacrificial lithium source particles 206 may be lowered. In some examples, the weight ratio of the sacrificial lithium source particles 206 to the CC particles 208 may be about 1:0.5, 1:1, 1:2, 1:3, 1:4, 1:5, 1:6, 1:7, 1:8, 1:9, 1:10, 1:15, 1:20, 1:50, or 1:100. As such, in some examples, the weight ratio of the sacrificial lithium source particles 106 to the CC particles 108 may be between 100:1 and 1:100. In further examples, the weight ratio may be between 50:1 and 1:50. In further examples, the weight ratio may be between 20:1 and 1:20. In further examples, the weight ratio may be between 15:1 and 1:15. In further examples, the weight ratio may be between 10:1 and 1:10. In further examples, the weight ratio may be between 9:1 and 1:9. In further examples, the weight ratio may be between 8:1 and 1:8. In further examples, the weight ratio may be between 7:1 and 1:7. In further examples, the weight ratio may be between 6:1 and 1:6. In further examples, the weight ratio may be between 5:1 and 1:5. In further examples, the weight ratio may be between 4:1 and 1:4. In further examples, the weight ratio may be between 3:1 and 1:3. In further examples, the weight ratio may be between 2:1 and 1:2. Further, the weight ratio of the sacrificial lithium source particles 206 to the CC particles 208 may be based on an anode composition and/or an extent of irreversible capacity loss necessary to compensate.

The surface coating 204 may be present within the active material at greater than 0% by weight and less than 50% by weight. In some examples, the surface coating 204 may be present within the active material at greater than 0.1% by weight and less than 50% by weight. In other examples, the surface coating 204 may be present within the active material at greater than 0.1% by weight and less than 30% by weight. In other examples, the surface coating 204 may be present within the active material at greater than 0.1% by weight and less than 10% by weight. In other examples, the surface coating 204 may be present within the active material at greater than 0.1% by weight and less than 5% by weight.

In some examples, the sacrificial lithium source particles 206 and/or CC particles 208 may adhere to and/or within the surface structures 210 via van der Waals molecular forces and/or mechanical forces. As such, a size of each of the sacrificial lithium source particles 206 and/or CC particles 208 may be complementary to a size of reciprocal surface structures 210 such that the sacrificial lithium source particles 206 and/or CC particles 208 may be partially secured therein. In some examples, the sacrificial lithium source particles 206 and/or CC particles 208 may be milled to a preselected average size. The preselected average size of the sacrificial lithium source particles 206 and/or CC particles 208 results in the retention of said particles on and partially within surface structures 210 of complementary size on the surface of the core particle 202. In other examples, the sacrificial lithium source particles 206 and/or CC particles 208 may have substantially different sizes such that said particles may be retained in matching-sized reciprocal surface structures 210.

The surface coating 204 may be composed of a high density of the sacrificial lithium source particles 206 and/or CC particles 208 such that the surface coating 204 may be considered to be uniform and continuous. In some examples, the surface coating 204 may further include the binder 211. Further, the surface coating 204 may vary in thickness depending upon the position of the sacrificial lithium source particles 206 and/or CC particles 208 on or within the surface of the core particle 202. In some examples, the thickness may be considered, at the maximum extent 205, the approximate size of sacrificial lithium source particles 206 and/or CC particles 208. In other words, the sacrificial lithium source particles 206 and CC particles 208, alone or in combination, may be arranged as a single layer, where a greatest thickness of the surface coating 204 of the core particles 202 may correspond to a largest particle size of the sacrificial lithium source particles 206 and/or CC particles 208.

In other examples, the surface coating 204 may be multiple layers thick at the maximum extent 205. For example, in some embodiments, multiple layers of the surface coating 204 may exist at the surface of the core particles 202. The thickness of the surface coating 204 may be no more than about 3 particles thick, wherein said particles may include the sacrificial lithium source particles 206 and/or CC particles 208. In additional or alternative examples, the thickness of the surface coating 204 may be no more than 3 μm thick.

The surface coating 204 may be applied to the core particles 202 by a number of methods (one example method is described below in reference to FIG. 7). In some methods, one or more properties of the core particles 202, sacrificial lithium source particles 206, CC particles 208, and/or binder 211 may be selectively controlled based upon method of preparation. For example, each of the average sizes of the sacrificial lithium source particles 206 and/or CC particles 208 may be optimized so as to obtain optimal electrochemical performance. In some methods, surface modification or surface grafting may be employed to achieve optimal interaction between the core particle 202 and the sacrificial lithium source particles 206, CC particles 208, and/or binder 211.

In some examples, the coated positive electrode active material particle 200 may be included in a battery including at least an electrolyte. Further, the surface coating 204 may be multiple layers thick and may include at least the binder 211. As such, outer layers of sacrificial lithium source particles 206 and/or CC particles 208 and the binder 211 may protect the core particle 202 and inner layers of sacrificial lithium source particles 206 and/or CC particles 208 from air, moisture, and other impurities in the electrolyte, thereby mitigating undesired side reactions.

FIGS. 3-5 depict embodiments of a process. Each of the embodiments of the process is schematically illustrated as a first coated positive electrode active material decomposing via a decomposition to a second coated positive electrode active material, wherein first and second decomposition products have been released and a residue remains. The first and second coated positive electrode active materials may include a plurality of like components. The second coated positive electrode active material may be distinguished from the first coated positive electrode active material in that one or more components of the first coated positive electrode active material have decomposed via the decomposition.

Referring now to FIG. 3, a process 300 is shown. A first coated positive electrode active material 301 may be coated positive electrode active material particle 100 of FIG. 1. In alternative embodiments of process 300 not depicted, first coated positive electrode active material 301 may be coated positive electrode active material particle 200 of FIG. 2. As such, the first coated positive electrode active material 301 may include a core particle 302. The core particle 302 may have a surface coating 304, wherein the surface coating 304 may include first sacrificial lithium source particles 306a, second sacrificial lithium source particles 306b, and CC particles 308. A passivating layer 312 may coat the core particle 302 such that the surface coating 304 may be disposed between the core particle 302 and the passivating layer 312. One or more of the first sacrificial lithium source particles 306a, second sacrificial lithium source particles 306b, and/or CC particles 308 may have a composition of one or more materials. In one example, the first sacrificial lithium source particles 306a may be lithium peroxide, lithium oxide, LAO, LFO, or a combination thereof. Further, the second sacrificial lithium source particles 306b may be lithium peroxide, lithium oxide, LAO, or a combination thereof. Further, the CC particles 308 may be one or more of NMC, LMFP, and cobalt tetraoxide, wherein the NMC may be one or more of NMC111, NMC523, NMC622, and NMC811. A composition of the first sacrificial lithium source particles 306a may be different from a composition of the second sacrificial lithium source particles 306b. The passivating layer 312 may be semi-permeable such that at least some decomposition products of the first and sacrificial lithium source particles 306a and 306b may pass through the passivating layer 312.

One or both of the first and second sacrificial lithium source particles 306a and 306b may decompose via decomposition 320. The decomposition 320 may include the CC particles 308 catalyzing a decomposition process of one or both of the first and second sacrificial lithium source particles 306a and 306b, such that at least two decomposition products may be produced. The decomposition products may originate from one or both of the first and second sacrificial lithium source particles 306a and 306b. In some examples, one or both of the first and second sacrificial lithium source particles 306a and 306b may undergo decomposition 320 substantially without the CC particles 308, such as when one of the first and sacrificial lithium source particles 306a and 306b is LAO or LFO, as described above in reference to FIG. 1.

Following the decomposition 320, second coated positive electrode active material 331 remains, having released first and second decomposition products 332 and 334. As depicted, each of the first and second sacrificial lithium source particles 306a and 306b may be decomposed via the decomposition 320, such that substantially no first and second sacrificial lithium source particles 306a and 306b remain in the second coated positive electrode active material 331. Further, one or both of the first and second sacrificial lithium source particles 306a and 306b have decomposed such that residue 336 remains in the second coated positive electrode active material 331, retained in the surface coating 304. As depicted, the CC particles 308 may remain unaltered by the decomposition 320. The first and second decomposition products 332 and 334 are depicted as having substantially passed through the passivating layer 312, which may be semi-permeable, as discussed above. Further, the first and second decomposition products 332 and 334 may be released in a well-dispersed manner. Further, manufacturing processes, such as those described in reference to FIGS. 6-8 below, may prevent significant agglomeration of one or both of the first and second sacrificial lithium source particles 306a and 306b relative to commonplace slurry coating processes, thereby resulting in homogeneous dispersion of said sacrificial lithium source particles 306a and 306b. As a result of such processes and coating structures, voids 338 may remain in the second coated positive electrode active material 331 following the decomposition 320. However, the voids 338 may have been at least partially present prior to a coating process of the core particle 302 as interstitial spacing between primary particles within the core particle 302. In examples wherein at least one of the first and second sacrificial lithium source particles 306a and 306b includes LAO or LFO, solid decomposition products (e.g., the residue 336) may form, such as one or more of $LiAlO_2$, $LiFeO_2$, $Al_2O_3$, and $Fe_2O_3$, following the decomposition 320. As such, a significant portion of the decomposition products from the first and second sacrificial lithium source particles 306a and 306b may be retained in the surface coating 304.

In one example, the first sacrificial lithium source particles 306a may be one or more of lithium peroxide and lithium oxide and the second sacrificial lithium source particles 306b may be LAO or LFO. Further, the process 300 may occur within a battery cell including at least a cathode, an anode, and an electrolyte, wherein the cathode includes the first coated positive electrode active material 301 prior to the decomposition 320. Following the decomposition 320, the first sacrificial lithium source particles 306a may decompose to the first and second decomposition products 332 and 334. The second sacrificial lithium source particles 306b may decompose to the first decomposition product 332 and the residue 336. In some examples, the first decomposition product 332 may be lithium ions, wherein the lithium ions may pass through the passivating layer 312, and from the cathode, to pre-lithiate the anode. The second decomposition product 334 may be oxygen, wherein the oxygen may pass through the passivating layer 312, and may then be released from the battery cell, such as via a compressive rolling of the battery cell. The residue 336 may be an aluminum-containing residue, such as aluminum oxide or alumina or $Al_2O_3$, which may provide safety enhancements, improved capacity, and stabilized cycling to the battery cell. Additionally or alternatively, the residue 336 may be an iron-containing residue.

The process 300 as depicted is one example of the decomposition 320. In some examples, no second sacrificial lithium source particles 306b may be present. In additional or alternative examples, no CC particles 308 may be present. In additional or alternative examples, at least some of the first and second sacrificial lithium source particles 306a and 306b may be present in the second coated positive electrode active material 331 (e.g., due to incomplete decomposition 320 either from inherent physical and/or chemical conditions or from conditions controlled so as to intentionally leave at least some sacrificial lithium source particles 306a, 306b unreacted for later activation and use). In additional or alternative examples, substantially more first and second sacrificial lithium source particles 306a and 306b may be present than CC particles 308. In additional or alternative examples, substantially more CC particles 308 may be present than first and second sacrificial lithium source particles 306a and 306b. In additional or alternative examples, substantially more first sacrificial lithium source particles 306a may be present than second sacrificial lithium source particles 306b. In additional or alternative examples, substantially more second sacrificial lithium source particles 306b may be present than first sacrificial lithium source particles 306a. In additional or alternative examples, no or substantially no residue 336 may remain in the second coated positive electrode active material 331. In additional or alternative examples, no or substantially no second decomposition product 334 may be produced or pass through the passivating layer 312. In additional or alternative examples, the residue 336 may include at least two differing compositions.

Referring now to FIG. 4, a process 400 is shown, wherein process 400 may be an additional or alternative embodiment of process 300 as described above in reference to FIG. 3. A first coated positive electrode active material 401 may be coated positive electrode active material particle 100 of FIG. 1. In alternative embodiments of process 400 not depicted, first coated positive electrode active material 401 may be coated positive electrode active material particle 200 of FIG. 2. As such, the first coated positive electrode active material 401 may include a core particle 402. The core particle 402 may have a surface coating 404, wherein the surface coating 404 may include sacrificial lithium source particles 406 and CC particles 408. A passivating layer 412 may coat the core particle 402 such that the surface coating 404 may be disposed between the core particle 402 and the passivating layer 412. In one example, the sacrificial lithium source particles 406 may be lithium peroxide or lithium oxide. Further, the CC particles 408 may be one or more of NMC, LMFP, and cobalt tetraoxide, wherein the NMC may be one or more of NMC111, NMC523, NMC622, and NMC811. The passivating layer 412 may be semi-permeable such that decomposition products of the sacrificial lithium source particles 406 may pass through the passivating layer 412.

The sacrificial lithium source particles 406 may decompose via decomposition 420. The decomposition 420 may include the CC particles 408 catalyzing a decomposition process of the sacrificial lithium source particles 406, such that at least two decomposition products may be produced. The decomposition products may originate from the sacrificial lithium source particles 406. In some examples, the sacrificial lithium source particles 406 may undergo decomposition 420 substantially without the CC particles 408.

Following the decomposition 420, second coated positive electrode active material 431 remains, having released first and second decomposition products 432 and 434. As depicted, the sacrificial lithium source particles 406 may be decomposed via the decomposition 420, such that substantially no sacrificial lithium source particles 406 remain in the second coated positive electrode active material 431. As depicted, the CC particles 408 may remain unaltered by the decomposition 420, retained in the surface coating 404. The first and second decomposition products 432 and 434 are depicted as having substantially passed through the passivating layer 412, which may be semi-permeable, as discussed above. Further, the first and second decomposition products 432 and 434 may be released in a well-dispersed manner. Further, manufacturing processes, such as those described in reference to FIGS. 6-8 below, may prevent significant agglomeration of the sacrificial lithium source particles 406 relative to commonplace slurry coating processes, thereby resulting in homogeneous dispersion of said sacrificial lithium source particles 406. As a result of such processes, voids 438 may remain in the second coated positive electrode active material 431 following the decomposition 420. However, the voids 438 may have been at least partially present prior to a coating process of the core particle 402 as interstitial spacing between primary particles within the core particle 402.

In one example, the sacrificial lithium source particles 406 may be one or more of lithium peroxide and lithium oxide. Further, the process 400 may be within a battery cell including at least a cathode, an anode, and an electrolyte, wherein the cathode includes the first coated positive electrode active material 401 prior to the decomposition 420. Following the decomposition 420, the sacrificial lithium source particles 406 may decompose to the first and second decomposition products 432 and 434. In some examples, the first decomposition product 432 may be lithium ions, wherein the lithium ions may pass through the passivating layer 412, and from the cathode, to pre-lithiate the anode. Further, the CC particles 408 may be a lithiated compound, such as LMFP, which may reversibly release and accept lithium ions during a charge cycle. The CC particles 408 may act as a catalyst either before or after releasing lithium ions during the charge process of a lithium-ion battery. In the case where the CC particles 408 act as a catalyst after partially or fully releasing lithium ions, the actual CC of the catalyst decomposition process may be the partially or fully delithiated CC particles 408, which may have a different chemical formula and/or crystal structure. As such, the CC particles 408 may release and accept the first decomposition product 432. The second decomposition product 434 may be oxygen, wherein the oxygen may pass through the passivating layer 412, and may then be released from the battery cell, such as via a compressive rolling of the battery cell.

The process 400 as depicted is one example of the decomposition 420. In some examples, no CC particles 408 may be present. In additional or alternative examples, at least some of the sacrificial lithium source particles 406 may be present in the second coated positive electrode active material 431 (e.g., due to incomplete decomposition 420 either from inherent physical and/or chemical conditions or from conditions controlled so as to intentionally leave at least some sacrificial lithium source particles 406 unreacted for later activation and use). In additional or alternative examples, substantially more sacrificial lithium source particles 406 may be present than CC particles 408. In additional or alternative examples, substantially more CC particles 408 may be present than sacrificial lithium source particles 406. In additional or alternative examples, no or substantially no second decomposition product 434 may be produced or pass through the passivating layer 412.

Referring now to FIG. 5, a process 500 is shown, wherein process 500 may be an additional or alternative embodiment of process 300 or process 400 as described above in reference to FIGS. 3 and 4, respectively. A first coated positive electrode active material 501 may be coated positive electrode active material particle 100 of FIG. 1. In alternative embodiments of process 500 not depicted, first coated positive electrode active material 501 may be coated positive electrode active material particle 200 of FIG. 2. As such, the first coated positive electrode active material 501 may include a core particle 502. The core particle 502 may have a surface coating 504, wherein the surface coating 504 may include sacrificial lithium source particles 506 and CC particles 508. A passivating layer 512 may coat the core particle 502 such that the surface coating 504 may be disposed between the core particle 502 and the passivating layer 512. In one example, the sacrificial lithium source particles 506 may be one or more of lithium peroxide and lithium oxide. Further, the CC particles 508 may be one or more of LAO and LFO. The passivating layer 512 may be semi-permeable such that decomposition products of the sacrificial lithium source particles 506 may pass through the passivating layer 512.

The sacrificial lithium source particles 506 and/or CC particles 508 may decompose via decomposition 520. The decomposition 520 may include the CC particles 508 catalyzing a decomposition process of the sacrificial lithium source particles 506, such that at least two decomposition products may be produced. The decomposition products may originate from the sacrificial lithium source particles 506 and/or CC particles 508. As discussed above in reference to FIG. 1, in some examples, the CC particles 508, being LAO and/or LFO, may further function as a secondary sacrificial lithium source material. As such, the CC particles 508 may provide dual benefits of catalyzing decomposition 520 and contributing lithium ions for pre-lithiation of the anode. In some examples, the sacrificial lithium source particles 506 may undergo decomposition 520 substantially without the CC particles 508.

Following the decomposition 520, second coated positive electrode active material 531 remains, having released first and second decomposition products 532 and 534. As depicted, the sacrificial lithium source particles 506 may be decomposed via the decomposition 520, such that substantially no sacrificial lithium source particles 506 remain in the second coated positive electrode active material 531. Further, the CC particles 508 have decomposed such that first and second residue 536a and 536b remain in the second coated positive electrode active material 531, retained in the surface coating 504. The first and second decomposition products 532 and 534 are depicted as having substantially passed through the passivating layer 512, which may be semi-permeable, as discussed above. Further, the first and second decomposition products 532 and 534 may be released in a well-dispersed manner. Further, manufacturing processes, such as those described in reference to FIGS. 6-8 below, may prevent significant agglomeration of the sacrificial lithium source particles 506 relative to commonplace slurry coating processes, thereby resulting in homogeneous dispersion of said sacrificial lithium source particles 506. As a result of such processes and coating structures, voids 538 may remain in the second coated positive electrode active material 531 following the decomposition 520. However, the voids 538 may have been at least partially present prior to a coating process of the core particle 502 as interstitial spacing between primary particles within the core particle 502. In examples wherein the CC particles 508 include LAO and/or LFO, solid decomposition products (e.g., the first and second residues 536a and 536b) may form, such as one or more of $LiAlO_2$, $LiFeO_2$, $Al_2O_3$, and $Fe_2O_3$, following the decomposition 520. As such, a significant portion of the decomposition products from the CC particles 508 may be retained in the surface coating 504.

In one example, the sacrificial lithium source particles 506 may be one or more of lithium peroxide and lithium oxide. Further, the process 500 may be within a battery cell including at least a cathode, an anode, and an electrolyte, wherein the cathode includes the first coated positive electrode active material 501 prior to the decomposition 520. Further, the CC particles 508 may be one or more of LAO and LFO. As such, the CC particles 508 may further function as a secondary sacrificial lithium source material. Following the decomposition 520, the sacrificial lithium source particles 506 may decompose to the first and second decomposition products 532 and 534. The CC particles 508 may decompose to the first decomposition product 532 and the first and second residues 536a and 536b. In some examples, the first decomposition product 532 may be lithium ions, wherein the lithium ions may pass through the passivating layer 512, and from the cathode, to pre-lithiate the anode. The second decomposition product 534 may be oxygen, wherein the oxygen may pass through the passivating layer 512, and may then be released from the battery cell, such as via a compressive rolling of the battery cell. The first and second residues 536a and 536b may provide safety enhancements, improved capacity, and stabilized cycling to the battery cell. In examples wherein the CC particles 508 include LAO, the first and second residues 536a and 536b may be aluminum-containing residues, such as $LiAlO_2$ and $Al_2O_3$, respectively. In examples wherein the CC particles 508 include LFO, the first and second residues 536a and 536b may be iron-containing residues, such as $LiFeO_2$ and $Fe_2O_3$, respectively.

The process 500 as depicted is one example of the decomposition 520. In some examples, no CC particles 508 may be present. In additional or alternative examples, at least some of the sacrificial lithium source particles 506 may be present in the second coated positive electrode active material 531 (e.g., due to incomplete decomposition 520 either from inherent physical and/or chemical conditions or from conditions controlled so as to intentionally leave at least some sacrificial lithium source particles 506 unreacted for later activation and use). In additional or alternative examples, substantially more sacrificial lithium source particles 506 may be present than CC particles 508. In additional or alternative examples, substantially more CC particles 508 may be present than sacrificial lithium source particles 506. In additional or alternative examples, no or substantially no first and second residues 536a and 536b may remain in the second coated positive electrode active material 531. In additional or alternative examples, no second residue 536b may remain in the second coated positive electrode active material 531. In additional or alternative examples, no or substantially no second decomposition product 534 may be produced or pass through the passivating layer 512.

Referring now to FIG. 6, a method 600 is shown for manufacturing a coated positive electrode active material, including coating a core powder in sacrificial lithium source and CC powders and optionally a conductive carbon source and/or a binder. A passivating layer may then be applied. In some examples, the coated positive electrode active material may be coated positive electrode active material particle 100, as discussed above in reference to FIG. 1, or first coated positive electrode active material 301, 401, or 501, as discussed above in reference to FIGS. 3-5.

At 602, the sacrificial lithium source powder may be milled to a first average size. An initial sacrificial lithium source powder may be purchased commercially. Though the sacrificial lithium source powder may be synthesized for high-purity proof-of-concept examples, for commercial feasibility, sacrificial lithium source powders produced via a scaled process may be appropriate for coated positive electrode active material manufacture. In some examples, the sacrificial lithium source powder may include lithium peroxide, LAO, LFO, lithium oxide, lithium nitride, or combinations thereof. Other sacrificial lithium source materials may further be used as an alternative or in combination.

An initial size of the sacrificial lithium source powder may be smaller than 1 μm. If, alternatively, the initial size of the sacrificial lithium source powder is 1 μm or larger, the sacrificial lithium source powder may be milled to a smaller, predetermined first average size. Specifically, the sacrificial lithium source powder may be milled via a ball or attrition milling process in an inert atmosphere for a selected period depending on desired size. In one example, the sacrificial lithium source powder may be milled for less than one hour to a finer powder with first average size of less than 1 μm. In one example, a volume may be half-filled with an inert media, such as YTZ® grinding media, of <5 mm size and the sacrificial lithium source powder. The volume may be milled for less than one hour to produce a finer sacrificial lithium source powder with first average size of less than 1 μm. In some examples, a SPEX® mill may be utilized and the inert media may be present in the volume at <35 wt. %.

As a duration of milling of the sacrificial lithium source powder increases, the first average size of the sacrificial lithium source powder may decrease. Thus, the first average size of the sacrificial lithium source powder may be controlled by the duration of milling. The first average size of the sacrificial lithium source powder may be confirmed via a bulk material analyzer. In some examples wherein the sacrificial lithium source powder includes lithium peroxide, the first average size of said sacrificial lithium source powder may be submicron so as to improve a catalytic effect of lithium peroxide reduction/decomposition.

At 604, the ACC powder may be milled to a second average size. The ACC powder may include a lithium-based compound, such as LMFP, LFP, LVFP, NMC, NCA, or combinations thereof, wherein the NMC may for example be a composition of one or more of NMC111, NMC523, NMC622, and NMC811. The NMC may be a single-phase crystal, or the NMC may be polycrystalline or amorphous in form. Other ACCs may further be used as an alternative or in combination.

The ACC powder may be milled to a predetermined second average size via ball or attrition milling. In some examples, the ACC powder may be milled via attrition milling with an organic solvent, such as NMP. The ACC powder may be milled for a selected period depending on desired size. In one example, the ACC powder may be milled for less than one hour to a finer powder with second average size of less than 1 μm. As a duration of milling of the ACC powder increases, the second average size of the ACC powder may decrease. Thus, the second average size of the ACC powder may be controlled by the duration of milling. As one example, a volume may be half-filled with an inert media, such as YTZ® grinding media, of 1 mm size and 70 wt. % ACC powder with NMP. As an additional or alternative example, the inert media may be alumina media of 5 mm size and 50 wt. % ACC powder with NMP. In some examples, the volume may then be milled for a duration of 2 to 5 hours at 1000 to 2000 rpm. In other examples, the volume may then be milled for a duration of 2 to 5 hours at 200 to 1000 rpm. The second average size of the ACC powder may be confirmed via a bulk material analyzer. In some examples, the second average size of the ACC powder may be less than or equal to the first average size of the sacrificial lithium source powder. In other examples, the second average size of the ACC powder may be greater than or equal to the first average size of the sacrificial lithium source powder.

At 606, the core powder may be mixed with the sacrificial lithium source and ACC powders, as well as conductive carbon additives and/or binders. The core powder may be a LMO, a lithium phosphate compound, or a combination thereof, but is not limited to these types of electrochemically active materials. As an example, the LMO may include NMC or NCA, where the NMC may be one or more of NMC111, NMC523, NMC622, and NMC811. The NMC may be a single-phase crystal, or the NMC may be polycrystalline or amorphous in form. The core powder may have an average size of 1 to 20 μm, or 6 to 12 μm.

Utilizing each of the sacrificial lithium source and ACC powders as direct conformal coatings on the core powder provides a drop in replacement powder for industry standard slurry coating processing. In some examples, there may be no extra processing step when applying one or more further layers to, for example, a pre-fabricated cathode.

In some examples, a dry blending, or dry mixing, process may be utilized, wherein complementary sizes of primary core, sacrificial lithium source, and ACC particles, and optionally conductive carbon and/or binder particles, may determine an effectiveness and extent of coating. Coating characterization may be performed using energy dispersive X-ray spectroscopy/scanning electron microscopy (EDS/SEM) and XRD analyses. In other words, EDS/SEM and XRD may be utilized to determine whether the sacrificial lithium source and ACC powders are conformally coated on the core powder.

In some examples, inert gas may be dispersed in a sealed vessel with a roll mill. Therein, ball mill mixing may improve mixing homogeneity of sacrificial lithium source, ACC, conductive carbon, and/or core powders.

In other examples, a wet blending process may be utilized. As in the dry blending process, the complementary sizes of primary core, sacrificial lithium source, and/or ACC powder particles may determine an effectiveness and extent of coating. In some examples, the solvent may be substantially moisture-free, such that the sacrificial lithium source and ACC powders may not substantially decompose. A moisture-free solvent may further prevent powder agglomerations from forming. The solvent being non-polar may influence the polarity of the mixture such that attraction via van der Waals molecular forces between the core, sacrificial lithium source, and/or ACC powder particles in the mixture may be induced. Following milling, the solvent may be evaporated via heating or vacuum/gas purging.

In other examples, a high-energy blending process may be utilized, wherein either the dry blending or wet blending process may be conducted in a higher energy attrition milling process. Higher energy collisions may occur in the high-energy blending process such that a more complete and consistent coating may be achieved. However, the collisions may be tuned such that the energy of the collisions may not be so high as to further reduce core, sacrificial lithium source, and/or ACC powder particle sizes. In other words, an energy of mixing may be set so as to not include a true milling or particle size reduction effect, but may still include more high energy collisions as compared to previous processing approaches.

In further examples, a mechanofusion blending process may be utilized. For example, a rotor/stator interaction driven by centrifugal force may drive high energy interactions between each of the core, sacrificial lithium source, and/or ACC powder particles. Via strong mechanical energies, each of the core, sacrificial lithium source, and/or ACC powder particles may be mechanically and/or chemically bound to one another. The mechanofusion blending process may be employed, as said process does not require use of a solvent or milling media. Further, containment may be air-free during blending/processing.

Utilizing each coating process as described above omits any cathode slurry mixing step in which sacrificial lithium source powder is added separately to the cathode slurry, as such a step may be entirely replaced by adding the core powder particles pre-coated with sacrificial lithium source. Further, each coating process as described above may ensure even distribution of the sacrificial lithium source and/or ACC powder particles such that the ACC powder particles may effectively and efficiently catalyze a decomposition process of the sacrificial lithium source powder particles via maximal particle-to-particle contact (e.g., via maximum surface area). Agglomerations and an under-utilization of the sacrificial lithium source powder particles may therefore be avoided, such that the sacrificial lithium source powder may decompose to provide an effective source of lithium ions for, as an example, pre-lithiation of an anode in a battery cell.

Optionally, in some examples, a conductive carbon additive and/or binder may be added. The conductive carbon additive may include, for example, one or more of vapor grown carbon fibers, Super P™, carbon blacks, Super C65, carbon nanotubes, graphene, and porous carbon structures. The binder may include, for example, one or more of PVDF, PVP, PEO, and PI. The conductive carbon additive and/or the binder may be mixed with the core powder coated with the sacrificial lithium source and ACC powders. As such, any of the mixing processes described above at 606 may be employed to coat the conductive carbon additive and/or the binder onto the core powder. In some examples, the conductive carbon additive and/or the binder may be added at 606 along with the sacrificial lithium source and ACC powders. The conductive carbon additive and/or the binder may increase a conductivity and improve kinetics of the core powder.

At 608, the passivating layer may be applied. The passivating layer may include a polymer, carbon, ceramic, zeolite, or hybrid coating. The passivating layer may have a thickness of at most 1 μm. In some examples, the passivating layer may be optional such that, in some examples, no or substantially no passivating layer may be applied.

In some examples, the passivating layer may be a polymer coating. In some examples, the polymer coating may be of low molecular weight, such as less than 100,000 Da, and may be applied at a low concentration. In additional or alternative examples, the polymer coating may include an ionically conductive polymer such as a crosslinked polyethylene glycol, crosslinked polyvinyl alcohol, polyimide, sodium carboxymethyl cellulose, sodium polyacrylate, or a combination thereof. In some examples, the coated core material may be mixed in a dilute polymer solution, vacuum-filtrated, and heat-dried to generate the polymer coating. Such a coating may further improve a FCE of a battery cell incorporating the coated positive electrode active material. However, such a coating may also decrease conductivity of the coated positive electrode active material. Therefore, to improve performance benefits in the battery cell, in additional or alternative examples, highly-structured and/or conductive carbon may be further included to generate a composite, or hybrid, coating. The conductive carbon may include, for example, one or more of vapor grown carbon fibers, Super P™, carbon blacks, Super C65, carbon nanotubes, graphene, and porous carbon structures. In one example, an easily-dispersed conductive carbon such as Super P™ may be selected in order to ensure a percolation network.

In other examples, the passivating layer may be a carbon coating, wherein the carbon coating may be a pitch or polymer coating followed by a carbonization step. The carbon coating may be amorphous in form. Further, the carbon coating may incorporate metal acetylides wherein the metal may include one or more of Cu, Al, Mg, Mn, Ni, and Co, and wherein the metal may be selected on a basis of optimal electrical conductivity and thermal stability. The metal may further be selected so as to be compatible with voltage limits of a battery cell of interest. A low-temperature process for carbon coating may be utilized, as at least some sacrificial lithium source materials, such as lithium peroxide, may decompose at higher temperatures, thereby altering a performance of the coated positive electrode active material. As such, the low-temperature process may be performed substantially at temperatures less than 280° C. One example includes using copper acetylide as a precursor for a carbon/metal coating, wherein temperatures as low as 150° C. may precipitate metal species. However, processing dangers exist if such a process is not performed at nanoscale, as a resultant mixture may otherwise be explosive. Other metal acetylides, such as at least some of the metal acetylides provided above, may mitigate explosive properties and improve process safety. Such a carbon coating, however, may be conformal, non-reactive, lithium-ion permeable, and may improve the FCE and conductivity of a battery cell.

In some examples, the passivating layer may be generated via any number of processes, including, but not limited to, glass or ceramic coating techniques.

In further examples, the passivating layer may include a zeolite material. A zeolite coating including said zeolite material may have highly stable, cage-like structure and controllable pore sizes, such that the zeolite material may not impede electron and ion transfer and may correspondingly be tuned to prevent moisture transfer. Further, the zeolite coating may provide a catalytic benefit in electrochemical reactions within a battery cell.

In other examples, the passivating layer may include graphene nanoplatelets which may be wrapped around the host particle (e.g., the coated core particle) with a high energy mechanical mixing method. A multilayer graphene structure or wrapped graphene layer may exhibit hydrophobicity and prevent moisture from passing through the passivating layer during the handling and manufacturing process while allowing for oxygen evolution during the battery formation process. The wrapped graphene layer may also improve electronic conductivity of the produced final powder.

Once retrieved, the coated positive electrode active material may be included in a cathode of a battery cell including at least said cathode, an anode, and an electrolyte. The coated positive electrode active material may efficiently and effectively pre-lithiate the anode such that a FCE and cycling performance of the battery cell may be improved. Method 600 then ends.

Referring now to FIG. 7, a method 700 is shown for manufacturing a coated positive electrode active material, including applying a surface coating including at least a sacrificial lithium source material to a core material. A passivating layer may then be applied. In some examples, the coated positive electrode active material may be coated positive electrode active material particle 100, as discussed above in reference to FIG. 1, coated positive electrode active material particle 200, as discussed above in reference to FIG. 2, or first coated positive electrode active material 301, 401, or 501, as discussed above in reference to FIGS. 3-5.

At 702, one or more coating materials may be dissolved to obtain a solution. The one or more coating materials may include the sacrificial lithium source material. For example, one or more coating materials may also be dispersed in a solvent to obtain a mixture. The sacrificial lithium source material used in the mixture may be, for example, an anti-fluorite structured material such as LAO or LFO. In additional or alternative examples, the one or more coating materials may further include a CC. The CC may be, for example, a lithium-based ACC, such as NMC or LMFP, or an inactive CC, such as cobalt tetraoxide. In some examples, the one or more coating materials may include materials that are not sacrificial lithium source materials or CCs, but may be chemically converted to sacrificial lithium source materials and/or CCs after one or more post-treatment processes. In some examples, the one or more coating materials may be dissolved in a solvent. The solvent may be any non-aqueous solvent which may be capable of dissolving the one or more coating materials. In some examples, the solvent may be an organic solvent, such as acetone, isopropanol, or NMP. In examples wherein the sacrificial lithium source material is an anti-fluorite structured material, aqueous-based solutions may not be present, as the anti-fluorite structured material may be sensitive to moisture. In additional or alternative examples, the sacrificial lithium source material may not substantially dissolve or may partially dissolve. In such cases, the mixture or solution may at least include particles of the sacrificial lithium source material fully dispersed and suspended in the solvent. In additional or alternative examples, the one or more coating materials may be dissolved in a binder solution. The binder solution may include a binder, such as PVDF, a cellulosic derivative, or a linear, semi-aromatic, or aromatic polyimide, dissolved in an organic solvent, such as NMP.

At 704, the core material may be mixed into the solution containing the one or more coating materials. The core material may be one or more of NMC and NCA, wherein the NMC may be one or more of NMC111, NMC523, NMC622, and NMC811. The NMC may be a single-phase crystal, or the NMC may be polycrystalline or amorphous in form. The core material may be in a particulate form having an average size of 1 to 20 μm, or 6 to 12 μm. The core material may be slowly poured into the solution such that a stoichiometric ratio between the core material and the one or more core materials may be obtained.

At 706, the solvent may be evaporated. In some examples, the solvent may be evaporated via a stirring process. The stirring process may be at least of a temperature necessary to substantially evaporate the solvent, such that the temperature is less than a boiling point of the solvent. In some examples, the stirring process may have duration of 0.5 to 24 hours. In some examples, a vacuum may be employed for evaporation, and the temperature may be lower than a corresponding stirring process at ambient pressure. In other words, the solution may be constantly stirred at a moderate temperature so as to evaporate the solvent.

At 708, a resultant product material may be heated to coat the core material with the one or more coating materials. In some examples, the resultant product material may be fired at a firing temperature of 300 to 1200° C., depending upon the solvent selected. In other examples, the resultant product material may be annealed at an annealing temperature of 80 to 1200° C., depending upon the binder and solvent selected. In some examples, annealing may result in formation of a polymer binder. Further, in some examples, additional annealing may provide a higher quality of the polymer binder.

At 710, the passivating layer may be applied. The passivating layer may include a polymer, carbon, ceramic, zeolite, or hybrid coating. The passivating layer may have a thickness of at most 1 µm. The passivating layer may be applied in any of the processes as described above in reference to FIG. 6. In some examples, the passivating layer may be optional such that, in some examples, no or substantially no passivating layer may be applied.

Once retrieved, the coated positive electrode active material may be included in a cathode of a battery cell including at least said cathode, an anode, and an electrolyte. The coated positive electrode active material may efficiently and effectively pre-lithiate the anode such that a FDC and cycling performance of the battery cell may be improved. Method 700 then ends.

Referring now to FIG. 8, a method 800 is shown for manufacturing a coated positive electrode active material, including converting a surface layer of a core material to obtain a sacrificial lithium source material and/or a CC. A passivating layer may then be applied. In some examples, the coated positive electrode active material may be coated positive electrode active material particle 100, as discussed above in reference to FIG. 1, or first coated positive electrode active material 301, 401, or 501, as discussed above in reference to FIGS. 3-5.

At 802, the core material may be obtained. The core material may be, for example, one or more of NMC and NCA, wherein the NMC may be one or more of NMC111, NMC523, NMC622, and NMC811. The NMC may be a single-phase crystal, or the NMC may be polycrystalline or amorphous in form. The core material may be in a particulate form having an average size of 1 to 20 µm, or 6 to 12 µm. As discussed in more detail below, the core material may have a surface layer with impurities resulting from the synthesis of the core material.

At 804, one or more precursor materials may be obtained. The one or more precursor materials may be any material which may be converted to a desired sacrificial lithium source material and/or CC. Desired sacrificial lithium source materials may be, for example, one or more of lithium peroxide, lithium oxide, and LAO. Desired CCs may be, for example, lithium-based ACCs, such as a NMC or LMFP, or inactive CCs, such as cobalt tetraoxide. In some examples, the one or more precursor materials may be milled to achieve a specific size range.

At 806, the core material may be coated with the one or more precursor materials. Therein, the one or more precursor materials may form a surface layer of the core material. In other examples, the core material may include a surface layer with impurities where the surface layer, in such examples, may be considered a surface coating. The impurities function as the precursor materials.

At 808, the surface layer may be converted to obtain a sacrificial lithium source material and/or CC. In some examples, converting the surface layer may involve heating the surface layer such that a chemical change is achieved, thereby producing the sacrificial lithium source material and/or the CC. In other examples, converting the surface layer may involve a chemical process such as a reaction between the one or more precursor materials and the core material, thereby producing the sacrificial lithium source material and/or the CC. As a further example, converting the surface layer may involve decomposing and reacting the one or more precursor materials, thereby producing the sacrificial lithium source material and/or the CC.

In one example, conversion of the surface layer may be performed in a furnace filled with air or inert gas. Therein, the core material with the surface layer may be heated at a heating temperature of between 80 and 1200° C. for a duration of between 0.5 and 18 hours. In some examples, the heating temperature may be between 200 and 900° C. In other examples, the heating temperature may be between 400 and 800° C. In some examples, the duration may be between 2 and 12 hours. In some examples, the duration may be between 2 and 8 hours.

At 810, the passivating layer may be applied. The passivating layer may include a polymer, carbon, ceramic, zeolite, or hybrid coating. The passivating layer may have a thickness of at most 1 µm. The passivating layer may be applied in any of the processes as described above in reference to FIG. 6. In some examples, the passivating layer may be optional such that, in some examples, no or substantially no passivating layer may be applied.

Once retrieved, the coated positive electrode active material may be included in a cathode of a battery cell including at least said cathode, an anode, and an electrolyte. The coated positive electrode active material may efficiently and effectively pre-lithiate the anode such that a FCE and cycling performance of the battery cell may be improved. Method 800 then ends.

In an example use, a coated positive electrode active material may be prepared according to one or a combination of the methods described hereinabove in reference to FIGS. 6-8. In some examples, the coated positive electrode active material may be combined with conductive additives and a binder to manufacture a positive electrode, or a cathode. Further, a battery may be manufactured, such that the battery includes the cathode as described above, a negative electrode, or an anode, a separator disposed between the cathode and the anode, and an electrolyte. In some examples, the negative electrode may include at least lithium metal. In additional or alternative examples, the negative electrode may include silicon or a silicon-graphite composite. In some examples, the battery may be a secondary lithium ion battery. In additional or alternative examples, the battery may be one of a plurality of batteries in a battery pack, wherein each of the plurality of batteries may be substantially identical to said battery.

As examples, FIGS. 9-12 depict properties of a lithium ion battery including at least a cathode, an anode, a separator disposed between the cathode and the anode, and an electrolyte. For each case discussed in reference to FIGS. 9-12, the lithium ion battery employed was a coin cell including pre-lithiation test electrodes prepared using a slurry coating method.

Materials were first prepared for slurry processing, the materials including a sacrificial lithium source material, ACC, conductive additive, binder, or a combination thereof. The materials were then dispersed in solvent via a high energy mixing process to obtain a slurry. The slurry was then coated onto aluminum foil in ambient conditions or an inert atmosphere glovebox. A given cathode was then stamped and included into a coin cell, wherein the coin cell further included at least an anode including at least lithium metal. It should be understood that a manufacturing process of a lithium ion battery incorporating inventive concepts as disclosed herein may not be limited to the slurry coating process as described hereinabove, and that said slurry coating process and resultant lithium ion battery are included as an example, and not a limitation.

Referring now to FIG. 9, plot 900 depicts potentials of a coin cell operated at two charge rates (as shown by curves 901 and 902). In one example, the coin cell includes at least a lithium metal anode and a cathode. The cathode includes at least a sacrificial lithium source material, wherein the sacrificial lithium source material is lithium peroxide. In each example depicted by plot 900, no ACC is present in the coin cell. Charge rates as employed herein are selected according to a maximum theoretical specific capacity of lithium peroxide (1168 mAh/g).

Curve 901 plots a potential resulting from applying a constant current at a faster, first charge rate of C/40 to the coin cell. In an example depicted by curve 901, a first specific capacity of 45 mAh/g is observed for the lithium peroxide. Curve 902 plots a potential resulting from applying a constant current at a slower, second charge rate of C/400 to the coin cell. In an example depicted by curve 902, a second specific capacity of 150 mAh/g at 40 hours is observed for the lithium peroxide.

In one example, lithium peroxide may decompose when a slow charge rate, such as C/400, is applied to the coin cell. Specifically, utilizing the slower, second charge rate may result in a reduction of an overpotential ascribed to a decomposition of lithium peroxide (as shown by curve 902). In other words, the slower, second charge rate may result in a decreased overpotential of the cathode, whereby the decomposition of lithium peroxide may be enabled. To further overcome the overpotential in scaled-up applications (e.g., a commercial lithium ion battery), a nanoscale lithium peroxide particle size coupled with a uniform dispersion of said particles on the cathode may be employed.

Referring now to FIG. 10, plot 1000 depicts potentials of coin cells including at least a lithium metal anode and a cathode. In one example, the cathode includes at least a sacrificial lithium source material, wherein the sacrificial lithium source material is lithium peroxide. In each coin cell tested, a different ratio of ACC to sacrificial lithium source material is employed. In one example (as shown by curve 1001), no ACC is present in the coin cell. In each example depicted by plot 1000, the ACC is LMFP. Further, in each example a constant current is applied to the coin cells at a charge rate of C/40, wherein the charge rate is selected according to a maximum theoretical specific capacity of lithium peroxide (1168 mAh/g).

Curve 1001 plots a potential of a first coin cell, wherein no LMFP is present. In the first coin cell, first specific capacity of 45 mAh/g is observed for the lithium peroxide. Curve 1002 plots a potential of a second coin cell, wherein a cathode includes at least LMFP and lithium peroxide. In the second coin cell, the ratio of LMFP to lithium peroxide is 1:5, and a second specific capacity of 325 mAh/g is observed for the lithium peroxide. Curve 1003 plots a potential of a third coin cell, wherein a cathode includes at least LMFP and lithium peroxide. In the third coin cell, the ratio of LMFP to lithium peroxide is 1:1, and a third specific capacity of 815 mAh/g is observed for the lithium peroxide.

As shown by curves 1001, 1002, and 1003, an increase in relative amount by mass of LMFP present in a slurry/cathode formulation resulted in increased decomposition of lithium peroxide. The increased decomposition is evidenced by a decreasing overpotential from curve 1001 to curve 1002 to curve 1003 (e.g., as the relative amount by mass of LMFP increases). Such an increase in the ratio of LMFP to lithium peroxide may increase an overall available surface area, thereby promoting catalysis of the decomposition of lithium peroxide. As such, an extractable lithium ion amount for pre-lithiation of the anode may increase as more LMFP is supplied as an ACC. Further, the overpotential decreasing with added LMFP indicates that the decomposition of lithium peroxide may be achieved in scaled-up applications with lower operating potentials (e.g., in commercial lithium ion batteries).

Referring now to FIG. 11, plot 1100 depicts PSDs 1101 and 1102 for a milling slurry including at least sacrificial lithium source particles, wherein the sacrificial lithium source particles are lithium peroxide. In some examples, an ACC may not be present in the cathode slurry.

An example manufacturing process for the slurry may include a premix milling step to decrease lithium peroxide particle size and increase lithium peroxide particle dispersion. The PSD 1101 shows the lithium peroxide particle size prior to the premix milling step. As shown, the PSD 1101 may be characterized by a bimodal distribution, with peaks thereof respectively occurring at about 10 μm and 100 μm. Following the premix milling step, the lithium peroxide particle size may be significantly reduced and the bimodal distribution may shift lower. The PSD 1102 exemplifies this shift, showing the lithium peroxide particle size following the premix milling step. As shown, the PSD 1102 may also be characterized by the bimodal distribution, with peaks thereof respectively occurring at about 0.1 μm and 5 D-values for each of the PSDs 1101 and 1102 are given below in Table 1.

TABLE 1

D-values for the PSDs 1101 and 1102

| PSD | D10 (μm) | D50 (μm) | D90 (μm) |
|---|---|---|---|
| PSD 1101 | 7.22 | 35.0 | 119 |
| PSD 1102 | 0.0596 | 0.278 | 3.88 |

Prior to the premix milling step, a D50 value of 35.0 μm was measured, whereas after the premix milling step, a D50 value of 0.278 μm was measured. As such, the premix milling step may generated sub-micron particle sizes to enable effective decomposition of the lithium peroxide particles. In other examples, a particle size of about 2 μm or less may enable effective decomposition of the lithium peroxide particles. Indeed, particle size domains larger than about 2 μm may be unlikely to enable said decomposition.

In other examples, a sufficiently uniform dispersion (e.g., a non-bimodal distribution) of the lithium peroxide particles may be employed in tandem with a small particle size domain to achieve complete or substantially complete lithium peroxide decomposition. As such, the premix milling step may be controlled such that a desired size and uniform dispersion of the lithium peroxide particles may be obtained.

Referring now to FIG. 12, plot 1200 depicts XRD patterns 1201 and 1202 of a first cathode and a second cathode, respectively. In one example, each of the first and second cathodes may at least include positive electrode active material coated with a sacrificial lithium source material and a CC, wherein the positive electrode active material is NMC, the sacrificial lithium source material is lithium peroxide, and the CC is cobalt tetraoxide. XRD pattern 1201 shows the first cathode, where the first cathode is under pristine conditions. XRD pattern 1202 shows the second cathode following cycling. Peaks 1203 may be ascribed to lithium peroxide. Comparing XRD patterns 1201 and 1202 indicates that peaks assigned to lithium peroxide significantly decrease in size following cycling.

Referring now to FIG. 13A, SEM image 1300 depicts a coated positive electrode active material particle 1301, where a coating of the coated positive electrode active material includes a sacrificial lithium source material, an ACC, and a conductive carbon additive. In one example, a positive electrode active material of the coated positive electrode active material particle 1301 is NMC, the sacrificial lithium source material is lithium peroxide, and the ACC is LMFP. The coated positive electrode active material particle 1301 may have a particle diameter of approximately 15 µm. As shown, the coating completely covers a surface of a positive electrode active material particle supporting the coating. Distinct morphological characteristics of the coating are further shown, indicating a degree of roughness which may originate from uneven particulate sizes and shapes of the various coating materials.

Referring now to FIG. 13B, EDS mapping of Fe is shown overlaid onto SEM image 1320 of coated positive electrode active material particles 1321, where a composition thereof may be the same as the coated positive electrode active material particle 1301 described above with reference to FIG. 13A. Specifically, the coating may include LMFP as an ACC. As shown, the LMFP is evenly distributed among the coated positive electrode active material particles, indicating that a coating process therefore results in uniform dispersion of the LMFP. The EDS mapping of Fe (lighter regions on surfaces of the coated positive electrode active material particles 1321) may thus confirm a presence of LMFP within the coating. Further, no LMFP-only aggregates were observed, indicating substantially complete utilization of the LMFP as a coated ACC.

Referring now to FIG. 13C, plot 1340 depicts a XRD pattern 1341 of coated positive electrode active material particles, such as the coated positive electrode active material particles 1301 and 1321 respectively described above with reference to FIGS. 13A and 13B, is shown. Specifically, a coating of the coated positive electrode active material particles may include lithium peroxide as a sacrificial lithium source material and LMFP as an ACC. The XRD pattern 1341 may be characterized by peaks 1342 and 1343, which indicate a presence of lithium peroxide and LMFP, respectively. In this way, XRD (e.g., the XRD pattern 1341 of FIG. 13C), SEM images, and EDS mapping thereon (e.g., SEM images 1300 and 1320 of FIGS. 13A and 13B, respectively), may be employed to structurally characterize a coated positive electrode active material particle and to confirm a composition of a coating disposed thereon.

Referring now to FIG. 14, a FCC voltage profile 1400 is shown for half cells, in which a half cell may be defined by including an anode being lithium metal, respectively including a first cathode having no sacrificial lithium source and a second cathode having the sacrificial lithium source coated onto positive electrode active material particles included therein. In one example, the sacrificial lithium source is lithium peroxide. Further, specific capacity may be determined based on a core composition of the positive electrode active material particles.

Curves 1401 and 1402 respectively depict initial charging of the first cathode and the second cathode, Comparing the curves 1401 and 1402 elucidates a plateau 1405 in the curve 1402, where the plateau 1405 may be attributed to lithium peroxide decomposition at higher potentials (e.g., greater than about 4.3 V). Notably, the curve 1402 corresponds to a higher $1^{st}$ charge capacity (FCC) (e.g., greater than 250 mAh/g) as compared to the curve 1401, which may be attributed to pre-lithiating action of the sacrificial lithium source. Further, curves 1403 and 1404 respectively depict initial discharging of the first cathode and the second cathode, where substantially similar discharge trends are shown.

Figure 15:
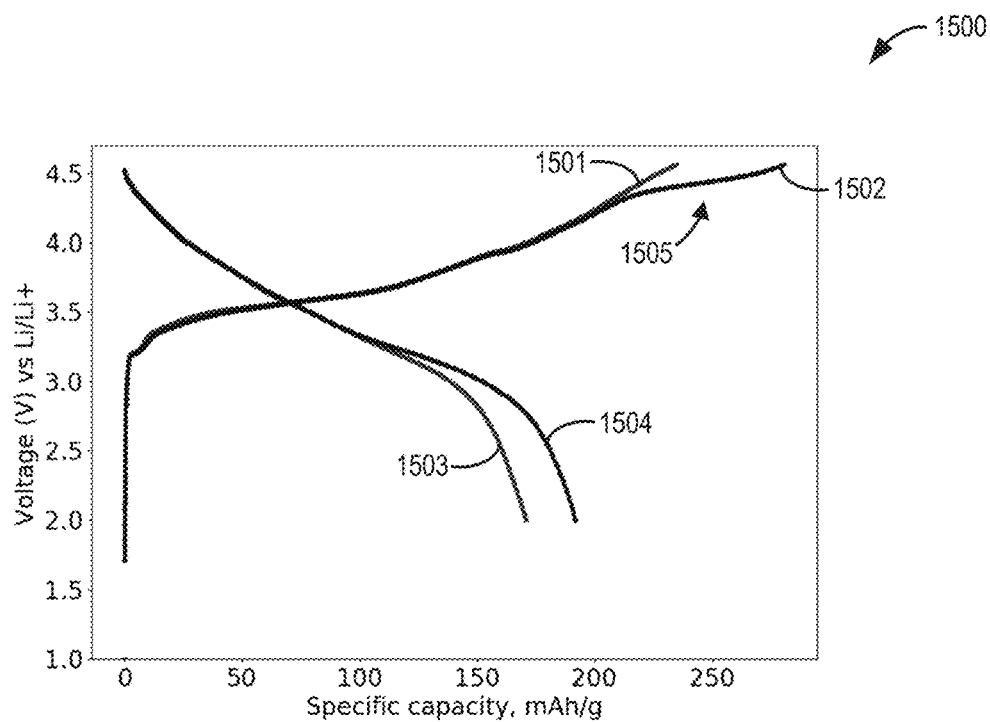
FIG. 15 shows FCC voltage profiles for full cells respectively including a cathode having no sacrificial lithium source and a cathode having the sacrificial lithium source.

Referring now to FIG. 15, a FCC voltage profile 1500 is shown for full cells, in which a full cell may be defined by including an anode being a material other than lithium metal, such as carbon or silicon, respectively including a first cathode having no sacrificial lithium source and a second cathode having the sacrificial lithium source coated onto positive electrode active material particles included therein. In one example, the sacrificial lithium source is lithium peroxide. Further, specific capacity may be determined based on a core composition of the positive electrode active material particles.

Curves 1501 and 1502 respectively depict initial charging of the first cathode and the second cathode. Comparing the curves 1501 and 1502 elucidates a plateau 1505 in the curve 1502, where the plateau 1505 may be attributed to lithium peroxide decomposition at higher potentials (e.g., greater than about 4.3 V). Further, curves 1503 and 1504 respectively depict initial discharging of the first cathode and the second cathode. Notably, the curve 1502 corresponds to a higher FCC charge capacity (e.g., greater than 250 mAh/g) as compared to the curve 1501, which may be attributed to pre-lithiating action of the sacrificial lithium source. Additionally, the curve 1504 corresponds to a higher FDC discharge capacity (e.g., about 200 mAh/g) as compared to the curve 1503, which may also be attributed to the pre-lithiating action of the sacrificial lithium source.

Figure 16:
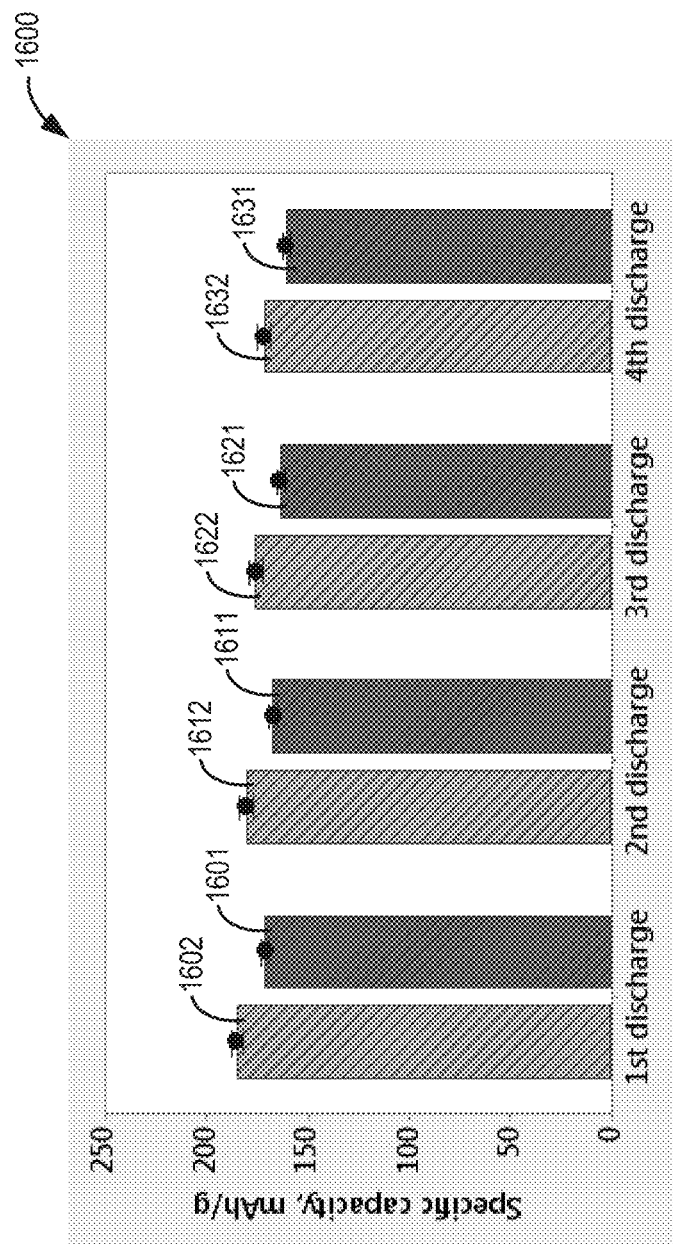
FIG. 16 shows discharge capacities during initial cycling of full cells respectively including a cathode having no sacrificial lithium source and a cathode having the sacrificial lithium source.

Referring now to FIG. 16, plot 1600 depicts discharge capacities during an initial four charge cycles of two full cells respectively including a first cathode having no sacrificial lithium source and a second cathode having the sacrificial lithium source coated onto positive electrode active material particles included therein. In one example, the sacrificial lithium source is lithium peroxide. Further, the discharge capacities may be determined based on a core composition of the positive electrode active material particles.

Specifically, bars 1601, 1611, 1621, and 1631 respectively represent discharge capacities for first, second, third, and fourth cycles of the full cell including the first cathode. Further, bars 1602, 1612, 1622, and 1632 respectively represent discharge capacities for first, second, third, and fourth cycles of the full cell including the second cathode. As shown, for each charge cycle tested, the full cell including the second cathode exhibits a higher discharge capacity than the full cell including the first cathode, which may be ascribed to the pre-lithiating action of the sacrificial lithium source included in the second cathode.

Referring now to FIG. 17A, a schematic diagram 1700 is depicted showing exemplary steps of a process for impregnating (porous) carbon source particles 1722 with sacrificial lithium source particles 1744. Impregnated carbon source particles 1742 may then be coated onto positive electrode active material particles, as discussed in detail below with reference to FIG. 17B. It will be appreciated that the impregnated carbon source particles 1742 formed by the depicted process may be used in combination with one or more of the coating methods described with reference to FIGS. 6-8. It will further be appreciated that the sacrificial lithium source particles 1744 may be the sacrificial lithium source particles as described above with reference to FIGS. 1-5.

Beginning at first exemplary schematic 1710, a container including sacrificial lithium source precursor particles 1714 dispersed in a solvent 1712 may be obtained. In some examples, the solvent 1712 may be methanol and the sacrificial lithium source precursor particles 1714 may be lithium hydroxide monohydrate (LiOH·H$_2$O). In some examples, the sacrificial lithium source precursor particles 1714 may be dissolved into the solvent 1712 at a concentration of 0.1 M.

As represented by directional arrow 1715, the carbon source particles 1722 may then be added, where second exemplary schematic 1720 depicts a solution resulting therefore. As the carbon source particles 1722 is added, the solution including the sacrificial lithium source precursor particles 1714 dispersed in the solvent 1712 may be stirred vigorously. As shown, the carbon source particles 1722 may be a porous carbon, having pores, or voids, 1724 throughout. In some examples, the carbon source particles 1722 may include Porocarb® Lion carbon particles (e.g., Porocarb® Lion 403 or Porocarb® Lion 509). The carbon source particles 1722 may be selected to have a d50 size of about 1 µm, or larger particles may be milled to a d50 size of about 1 µm. Alternatively, pre-existing carbon source particles 1722 may be milled to a d50 size of less than 1 µm. In some examples, a bimodal PSD may be obtained, where each peak of the bimodal PSD may be at or below 1 µm. Such a bimodal PSD may allow for more efficient packing onto a surface coating, or in formation of a surface coating. In some examples, approximately 100 mg of the carbon source particles 1722 may be added for every 100 mL of the solution.

As represented by directional arrow 1725, the resultant solution may then be ultrasonicated for a first predetermined duration, such as 15 min, and/or the resultant solution may be soaked for a longer, second predetermined duration. As such, the sacrificial lithium source precursor particles 1714 dispersed in the solvent 1712 may be more thoroughly distributed among the carbon source particles 1722 and may penetrate the pores 1724 thereof to form the precursor-impregnated carbon source particles 1732, as shown in third exemplary schematic 1730.

As represented by the directional arrow 1735, a sacrificial lithium source formation solution may then be added to form the sacrificial lithium source particles 1744. In examples wherein the sacrificial lithium source precursor particles 1714 include lithium hydroxide monoxide, the sacrificial lithium source formation solution may include a 15 mol % excess of 50% hydrogen peroxide (H$_2$O$_2$) solution. In such examples, the sacrificial lithium source formation solution may be added dropwise to the solvent 1712 having the precursor-impregnated carbon source particles 1732. The resultant solution may then be vigorously stirred at 35° C. The sacrificial lithium source particles 1744 may then be formed within the voids 1724 of the carbon source particles 1722 to obtain the impregnated carbon source particles 1742, as shown in fourth exemplary schematic 1740. In some examples, the sacrificial lithium source particles 1744 thus formed may be composed of a lithium peroxide complex. For example, the sacrificial lithium source particles 1744 may be composed of Li$_2$O$_2$·H$_2$O$_2$·3H$_2$O·8CH$_3$OH.

As represented by the directional arrow 1745, the resultant solution (that is, the impregnated carbon source particles 1742 dispersed in the solvent 1712) may be filtered over filter paper or centrifuged and decanted to obtain the impregnated carbon source particles 1742, as shown in fifth exemplary schematic 1750. The impregnated carbon source particles 1742 may then be rinsed repeatedly (e.g., with methanol and ethanol). In some examples, following rinsing, the impregnated carbon source particles 1742 may be centrifuged, decanted, and rinsed again. The impregnated carbon source particles 1742 may then be collected and vacuum dried at a temperature of between about 100° C. and 110° C. for 24 hours.

The impregnation process as shown in FIG. 17A may ensure an even distribution of the sacrificial lithium source particles 1744, as well as a small particle size thereof. In some examples, about 30% of the carbon source particles 1722 may be occupied by the sacrificial lithium source particles 1744 by volume. That is, the carbon source particles 1722 may have about 30% porosity. As such, the impregnated carbon source particles 1742 may serve as both a conductive additive and a pre-lithiation source when coated onto a positive electrode active material particle, as described below with reference to FIG. 17B. Specifically, the carbon source particles 1722 may function as the conductive additive and the sacrificial lithium source particles 1744 impregnated therein may function as the pre-lithiation source. The finally-formed impregnated carbon source particles 1742 may thus supplant the conductive carbon and the sacrificial lithium source material in mechanofusion blending dry coating processes, such as method 600 as described above with reference to FIG. 6. Further catalysts (e.g., CCs or ACCs) and binders may be employed in combination with the impregnated carbon source particles 1742 to form continuous and uniform coatings on positive electrode active material particles in such dry coating processes.

Referring now to FIG. 17B, a schematic diagram 1760 is depicted showing exemplary steps of a process for coating a positive electrode active material particle 1772 with impregnated carbon source particles 1742 to form a first coated positive electrode active material particle 1782. A plurality of first coated positive electrode active material particles 1782 may then be coated onto a cathode current collector to form a cathode in a lithium ion battery, whereby the impregnated carbon source particles 1742 may function as both a conductive additive and a pre-lithiation source during cycling. It will be appreciated that the first coated positive electrode active material particles 1782 may be formed in combination with one or more of the coating methods described with reference to FIGS. 6-8. It will further be appreciated that the positive electrode active material particle 1772 may be any of the positive electrode active material particles as described above with reference to FIGS. 1-5.

Beginning at sixth exemplary schematic 1770, the positive electrode active material particle 1772 may be obtained. In some examples, the positive electrode active material particle 1772 may be composed of NMC. It will be appreciated that the positive electrode active material particle 1772 may be obtained at a predetermined particle size or may be milled to a desired particle size from an initially larger particle size. As represented by directional arrow 1775, the positive electrode active material particle 1772 may be coated with the impregnated carbon source particles 1742, such as via a mechanofusion dry blending process. The first coated positive electrode active material particle 1782 may thus be formed, as shown by seventh exemplary schematic 1780.

As represented by directional arrow 1785, the first coated positive electrode active material particle 1782 may then be coated along with other, similarly formed first coated positive electrode active material particles 1782 onto the cathode current collector (e.g., in a slurry-based process) and implemented in the lithium ion battery. During initial battery cycling, the sacrificial lithium source particles 1744 within the impregnated carbon source particles 1742 may then decompose into first and second decomposition products 1794 and 1796. As such, a second coated positive electrode active material particle 1792 partially free or substantially free of the sacrificial lithium source particles 1744 may be formed, as shown by eighth exemplary schematic 1790.

In examples wherein the sacrificial lithium source particles 1744 include lithium peroxide, the first decomposition product 1794 may be lithium ions and the second decomposition product 1796 may be oxygen. Specifically, the first and second decomposition products 1794 and 1796 may exit the voids (e.g., 1724) of the carbon source particles 1722 and enter an electrolyte included in the lithium ion battery. The carbon source particles 1722 may thus provide extended percolation networks for the electrolyte and lithium ions within a coating of the second coated positive electrode active material particle 1792 by retaining a portion of the electrolyte within the voids thereof following decomposition of the sacrificial lithium source particles 1744, as the voids may be partially free or substantially free of the sacrificial lithium source particles 1744. In turn, the extended percolation networks may provide increased conductivity by providing additional electronic pathways.

Further, the carbon source particles 1722 may provide additional structural integrity to the coating of the second coated positive electrode active material particle 1792, helping to ensure that the coating remains intact and stable. The stabilized coating, retaining the carbon source particles 1722, and thus the conductive benefits therefrom, may result in further improvements in electrochemical performance. In some examples, a desire to add further conductive additives to the coating may therefore be obviated. In additional or alternative examples, the coating may be free of further catalysts (e.g., CCs or ACCs) if good electrical contact with high surface area sacrificial lithium source particles 1744 is maintained by the carbon source particles 1722 prior to decomposition.

Referring now to FIG. 18, a method 1800 is shown for forming a carbon source impregnated with a sacrificial lithium source material. The carbon source impregnated with the sacrificial lithium source material may then be coated onto a positive electrode active material. It will be appreciated that the carbon source may be the carbon source particles 1722 described above with reference to FIGS. 17A and 17B. It will further be appreciated that the positive electrode active material may be the positive electrode active material particle 1772 described above with reference to FIG. 17B.

At 1802, a sacrificial lithium source material precursor may be dissolved in a solvent to obtain a first precursor solution (e.g., as shown in the first exemplary schematic 1710 of FIG. 17A). In some examples, the sacrificial lithium source material precursor may be lithium hydroxide monohydrate and the solvent may be methanol. In such examples, the sacrificial lithium source material precursor may be dissolved in the solvent at a concentration of 0.1 M.

At 1804, the carbon source may be added to the first precursor solution (e.g., as shown in the second exemplary schematic 1720 of FIG. 17A). In some examples, the carbon source may be a porous carbon source such as Porocarb® Lion carbon particles (e.g., Porocarb® Lion 403 or Porocarb® Lion 509). In some examples, about 100 mg of the carbon source may be added to about every 100 mL of the first precursor solution. A total amount of the carbon source added may depend on one or more of a particle size and a PSD of the carbon source. As an example, a d50 particle size of the carbon source may be selected to be 1 μm or the carbon source may be milled to the d50 particle size of less than 1 μm. As another example, the PSD may be bimodal, with each peak of the bimodal PSD being at or below 1 μm.

At 1806, the carbon source may be impregnated with the sacrificial lithium source material precursor (e.g., as shown in the third exemplary schematic 1730 of FIG. 17A). In some examples, the first precursor solution may be ultrasonicated for about 15 min. In additional or alternative examples, the first precursor solution may be left for an extended period of time (e.g., longer than 15 min) to allow the sacrificial lithium source material precursor to penetrate pores of the carbon source.

At 1808, a second precursor solution may be added to the first precursor solution to form the sacrificial lithium source material impregnated within the carbon source (e.g., as shown in the fourth exemplary schematic 1740 of FIG. 17A). In examples wherein the sacrificial lithium source material precursor is lithium hydroxide monohydrate and the solvent is methanol, the second precursor solution may be 15 mol % excess of 50% hydrogen peroxide. In additional or alternative examples, the second precursor solution may be added dropwise under vigorous stirring at 35° C. In some examples, the sacrificial lithium source material thus formed may be lithium peroxide.

At 1810, the carbon source impregnated with the sacrificial lithium source material may be extract from a resultant solution (e.g., as shown in the fifth exemplary schematic 1750 of FIG. 17A). In some examples, extracting the carbon source impregnated with the sacrificial lithium source material may include filtering the resultant solution over filter paper. In other examples, extracting the carbon source impregnated with the sacrificial lithium source material may include centrifuging and decanting the resultant solution. The extracted carbon source impregnated with the sacrificial lithium source material may then be washed repeatedly with methanol and ethanol. In some examples wherein extracting the carbon source impregnated with the sacrificial lithium source material includes centrifuging and decanting the resultant solution, the centrifuging, decanting, and washing may then be repeated. The carbon source impregnated with the sacrificial lithium source material may then be collected and vacuum dried, e.g., at 100 to 110° C. for 24 hours.

At 1812, the positive electrode active material may be coated with the carbon source impregnated with the sacrificial lithium source material (e.g., as shown in the seventh exemplary schematic 1780 of FIG. 17B). In some examples, the positive electrode active material may be NMC. In some examples, coating the positive electrode active material may include a mechanofusion blending dry coating process, such as employed in the method 600 as described above with reference to FIG. 6. The coated positive electrode active material may then be coated onto a cathode current collector (e.g., in a slurry-based process) to form a cathode for a lithium ion battery. The cathode, being implemented in the lithium ion battery, may provide pre-lithiation during initial cycling of the lithium ion battery. In this way, each of a FDC and cycling performance of the finally formed lithium ion battery may be improved.

To obtain a cathode including an even mixing of the positive electrode active material, the sacrificial lithium source material, and the carbon source, a slurry-based approach employing a polymeric binder may be utilized. Typical slurry-based approaches in the prior art may use PVDF or PVDF-co-hexafluoropropylene (PVDF-HFP) as the polymeric binder, whether or not a sacrificial lithium source material is included. However, in light of such prior art, the inventors have unexpectedly found that PVDF and PVDF-HFP are strongly incompatible with sacrificial lithium source materials such as lithium peroxide. Specifically, many sacrificial lithium source materials are basic when in contact with trace amounts of water (often unavoidable in slurry preparation). In such basic environments, PVDF and PVDF-HFP may quickly and irreversibly gel due to dehydrofluorination. Poor-quality slurry coatings therefore result, or unprocessable slurries which may not coat at all. As such, PVP may be substituted for PVDF or PVDF-HFP to avoid dehydrofluorination entirely. As such, utilizing PVP as the polymer binder for binding coated positive electrode active material particles in slurry-based approaches may result in higher quality slurries and coatings.

In some examples, the finally-formed slurry may have a binder content of 0-10 wt. %, 1-6 wt. %, or 2-5 wt. %. In some examples, the finally-formed slurry may have a carbon content of 0-10 wt. %, 1-5 wt. %, or 2-4 wt. %. A weight percentage of the sacrificial lithium source material may depend on a composition of an anode paired with the cathode in the lithium ion battery. For example, the finally-formed slurry may have a range of sacrificial lithium source material content less than 15 wt. %, 10 wt. %, or 5 wt. %. In some examples, the finally-formed slurry may have a sacrificial lithium source material content of 1-4 wt. %. Further, when a CC is included in the finally-formed slurry, a CC to sacrificial lithium source material ratio may depend on a composition of the CC. As an example, a range of the CC to sacrificial lithium source material ratio in the finally-formed slurry may be between 1:1 and 4:1. As another example, the range of the CC to sacrificial lithium source material ratio in the finally-formed slurry may be between 0.2:1 and 0.7:1. In some examples, the finally-formed slurry may have a positive electrode active material content of 80-100 wt. % or 85-95 wt. %.

In further examples, a method for manufacturing a coated positive electrode active material may include obtaining a lithiated core material with a surface layer, and converting the surface layer to obtain a sacrificial lithium source material. The core material may be one or more of NMC and NCA, wherein the NMC may be one or more of NMC111, NMC523, NMC622, and NMC811. The NMC may be a single-phase crystal, or the NMC may be polycrystalline or amorphous in form. In some examples, the core material may be in a particulate form having an average size of 1 to 20 µm, or 6 to 12 µm.

In some examples, the core material may include one or more impurities, such as $Li_2O$, LiOH, or $Li_2CO_3$, which may result from the synthesis process of the core material. In some examples, the impurities may be contained within the surface layer of the core material. In some examples, converting the surface layer may include converting the one or more impurities in the surface layer to the sacrificial lithium source material. In some examples, converting the surface layer may involve heating the surface layer such that a chemical change may be achieved, thereby producing the sacrificial lithium source material. In other examples, converting the surface layer may involve a chemical reaction wherein the one or more impurities may serve as reactants, thereby producing the sacrificial lithium source material.

In some examples, a passivating layer may then be applied. The passivating layer may include a polymer, carbon, ceramic, zeolite, or hybrid coating. The passivating layer may have a thickness of at most 1 µm. The passivating layer may be applied in any of the processes as described above in reference to FIG. 6. In some examples, the passivating layer may be optional such that, in some examples, no or substantially no passivating layer may be applied. Once retrieved, the coated positive electrode active material may be included in a cathode of a battery cell including at least said cathode, an anode, and an electrolyte. The coated positive electrode active material may efficiently and effectively pre-lithiate the anode such that a FCE and cycling performance of the battery cell may be improved. In some examples, the method described hereinabove may be combined in whole or in part with method 800 as described in reference to FIG. 8.

In further examples, pre-lithiation may extend beyond a first charge cycle. As such, a battery cell including at least an anode and a cathode may be designed such that a cathode sacrificial lithium source material may provide lithium ions to the anode for an extended period of cycling of the battery cell. In some examples, extended anodic pre-lithiation may include various combinations of sacrificial lithium source materials and/or CCs (e.g., ACCs, inactive CCs) to achieve custom voltage performance. Lithium ion release potential of a given sacrificial lithium source material may be dependent upon composition of said material, particle size of said material, and the presence of one or more CCs. During cycling, the battery cell may reach potentials across a potential range, such that pre-lithiation may be desired at both a higher and a lower end of said range. As such, one or more catalyst compositions in tandem with one or more particle sizes may be utilized.

In further examples, one or more passivating layers may be applied to a surface of a positive electrode active material particle including one or more sacrificial lithium source materials, catalysts, or combinations thereof. The one or more passivating layers may include a semi-permeable coating, as discussed above, or a stabilizing lithiated compound, such as $Li_2CO_3$.

In some examples, a sacrificial lithium source material in the form of a cathode additive for pre-lithiation of an anode may include one or more binary and/or ternary compounds. The binary compounds may include $Li_2S$, $Li_3N$, $LiN_3$, $Li_2O$, $Li_2O_2$, LiF, or a combination thereof. A decomposition of $Li_2S$ may result in lithium ion release and sulfur formation. $Li_3N$ may show a higher theoretical capacity as compared to other materials described herein. A decomposition of $Li_3N$ may result in lithium ion release and nitrogen gas formation. In some examples, the binary compounds may include lithium and oxygen, such as in $Li_2O$ and $Li_2O_2$. Decompositions of $Li_2O$ and $Li_2O_2$ may result in lithium ion release and oxygen gas formation, wherein no additional solid materials remain in a given cathode. Each of $Li_2O$ and $Li_2O_2$ exhibit high capacity, and as such, require less material than, for example, anti-fluorite structured materials to effectively pre-lithiate an anode in a battery cell.

The ternary compounds may include lithium, oxygen, and a transition metal. In some examples, the ternary compounds may include $Li_5AlO_4$, $Li_5FeO_4$, $Li_2NiO_2$, $Li_6CoO_4$, $Li_2MoO_3$, or a combination thereof. Anti-fluorite structured materials, such as $Li_5AlO_4$ and $Li_5FeO_4$, may result in lithium ion release and metal oxide and oxygen gas formation. In a typical battery voltage range, anti-fluorite structured materials may not take lithium ions back, thereby irreversibly providing lithium ions to pre-lithiate an anode in a battery cell.

The sacrificial lithium source material may be a blend of one or more of the binary compounds, such as one or more of $Li_2S$, LiF, and $Li_2O$, and one or more metals, such as Co, to form a conversion-type pre-lithiation reagent. In certain charge voltage ranges, a conversion reaction may release lithium ions and form a corresponding metal compound, such as one or more of CoS, $CoF_3$, and $Co_3O_4$. Sufficient mixing may be required to decrease a voltage of conversion to a desired value.

An additional CC, such as an ACC, may be required to decrease a voltage for decomposition of the sacrificial lithium source material to a desired value. In some examples, the CC may include Pt, $La_{0.8}Sr_{0.2}MnO_3$, $Fe_2O_3$, NiO, $Fe_3O_4$, $Co_3O_4$, CuO, $CoFe_2O_4$, $LiFe_{0.5}Mn_{0.5}PO_4$, or a combination thereof. Additionally or alternatively, a reduction in particle size of the sacrificial lithium source material may decrease the voltage for decomposition of said material to a desired value. At least some example sacrificial lithium source material and/or CC compositions may leave residues within and/or on a cathode which may lower energy density. Manufacture of such sacrificial lithium source materials and/or catalysts may utilize analogous configurations and methods as disclosed herein.

In this way, a coated positive electrode active material for a lithium ion battery is provided. A sacrificial lithium source included in the coated positive electrode active material may provide an excess of lithium ions to the battery such that undesirable lithium loss at an anode in the battery may be compensated. The excess lithium ions provided by the sacrificial lithium source may also be utilized for formation of a solid-electrolyte interphase layer if the sacrificial lithium source decomposes at a lower potential than a delithiation potential of the positive electrode active material itself. The sacrificial lithium source, upon decomposition, may produce one or more easily removable decomposition products, such as oxygen, or may leave a residue which may confer a secondary purpose to the battery (e.g., safety, cycling stability). The coated positive electrode active material may optionally include a passivating layer such that further components of the coated positive electrode active material may be protected from degradation by air, moisture, and an electrolyte in the battery. One technical effect of the coated positive electrode active material as presented may be that a first-cycle discharge capacity and cycling performance of the battery may be improved.

In one example, a positive electrode active material for a lithium ion battery, comprising: a lithiated compound core and a surface coating surrounding the core, the surface coating comprising at least a sacrificial lithium source. In some examples, the surface coating comprises a weight ratio of the sacrificial lithium source to the cathode catalyst of between 10:1 and 1:10.

In another example, a method for manufacturing a positive electrode active material, the method comprising: milling a sacrificial lithium source powder to a first average size, milling a cathode catalyst powder to a second average size, and mixing and coating a lithiated core powder with the sacrificial lithium source powder and the cathode catalyst powder.

In yet another example, a method for manufacturing a positive electrode active material, the method comprising: obtaining a lithiated core material with a surface layer and converting the surface layer to obtain one or both of a sacrificial lithium source material and a cathode catalyst. In some examples, the surface layer comprises one or more impurities. In additional or alternative examples, the impurities are one or more of LiOH, $Li_2O$, and $Li_2CO_3$, and converting the surface layer includes converting the impurities to the sacrificial lithium source material. In additional or alternative examples, the surface layer comprises one or more precursor materials.

In still another example, a lithium ion battery, comprising: a positive electrode comprising a lithiated compound coated with a surface coating, wherein the surface coating comprises a sacrificial lithium source, a lithium-based active cathode catalyst, or a combination thereof, a negative electrode comprising at least lithium metal, a separator disposed between the positive electrode and the negative electrode, and an electrolyte. In some examples, the negative electrode further comprises silicon or a silicon-graphite composite.

In one example, a cathode material for a lithium ion battery comprises a lithiated compound core, and a surface coating surrounding the lithiated compound core, the surface coating comprising a sacrificial lithium source, wherein the sacrificial lithium source is in the form of particles having a particle size distribution, the particle size distribution having peaks at or below 1 μm. A first example of the cathode material further includes wherein the lithiated compound core is NMC or NCA. A second example of the cathode material, optionally including the first example of the cathode material, further includes wherein a passivating layer surrounds the surface coating. A third example of the cathode active material, optionally including one or more of the first and second examples of the cathode active material, further includes wherein the sacrificial lithium source is one or more of lithium peroxide, lithium oxide, lithium nitride, lithium aluminum oxide, and lithium iron oxide. A fourth example of the cathode active material, optionally including one or more of the first through third examples of the cathode active material, further includes wherein the surface coating further comprises a cathode catalyst. A fifth example of the cathode active material, optionally including one or more of the first through fourth examples of the cathode active material, further includes wherein the cathode catalyst is a first lithium mixed metal oxide, a lithium phosphate compound, a metal oxide, or a combination thereof. A sixth example of the cathode active material, optionally including one or more of the first through fifth examples of the cathode active material, further includes wherein the cathode catalyst is cobalt tetraoxide. A seventh example of the cathode active material, optionally including one or more of the first through sixth examples of the cathode active material, further includes wherein the cathode catalyst is the first lithium mixed metal oxide and the lithiated compound core is a second lithium mixed metal oxide, where the first lithium mixed metal oxide is the second lithium mixed metal oxide. An eighth example of the cathode active material, optionally including one or more of the first through seventh examples of the cathode active material, further includes wherein the cathode catalyst is the first lithium mixed metal oxide and the lithiated compound core is a second lithium mixed metal oxide, where the first lithium mixed metal oxide is different than the second lithium mixed metal oxide. A ninth example of the cathode active material, optionally including one or more of the first through eighth examples of the cathode active material, further includes wherein the surface coating comprises a weight ratio of the sacrificial lithium source to the cathode catalyst of about 1:0.7 to about 1:4.

In another example, a method for manufacturing a cathode material comprises obtaining one or more precursor materials, converting the one or more precursor materials to one or more sacrificial lithium source materials and/or a cathode catalyst, and forming the cathode material, the cathode material comprising a lithiated core material with a surface layer disposed thereon, wherein the one or more sacrificial lithium source materials and/or the cathode catalyst are included in the surface layer. A first example of the method further includes wherein converting the one or more precursor materials includes reacting the lithiated core material with the one or more precursor materials to produce one or more sacrificial lithium source materials and/or the cathode catalyst, or decomposing and reacting the one or more precursor materials to produce one or more sacrificial lithium source materials and/or the cathode catalyst. A second example of the method, optionally including the first example of the method, further includes wherein impregnating a porous carbon source with at least one of the one or more precursor materials, and converting the one or more precursor materials to form the one or more sacrificial lithium source materials, such that the one or more sacrificial lithium source materials are impregnated within the porous carbon source. A third example of the method, optionally including one or more of the first and second examples of the method, further includes wherein forming the cathode material includes coating the lithiated core material with the porous carbon source impregnated with the one or more sacrificial lithium source materials, such that the surface layer comprises the porous carbon source impregnated with the one or more sacrificial lithium source materials. A fourth example of the method, optionally including one or more of the first through third examples of the method, further includes wherein the lithiated core material is NMC and the one or more sacrificial lithium source materials include lithium peroxide. A fifth example of the method, optionally including one or more of the first through fourth examples of the method, further includes wherein the method further comprises applying a passivating layer.

In yet another example, a lithium ion battery comprises a positive electrode comprising a cathode current collector coated in a cathode material layer, wherein the cathode material layer comprises a lithiated compound coated with a surface coating, the surface coating comprising a sacrificial lithium source and a lithium-based active cathode catalyst, and a polyvinyl pyrrolidone binder, a negative electrode comprising at least lithium metal, a separator disposed between the positive electrode and the negative electrode, and an electrolyte. A first example of the lithium ion battery further includes wherein the sacrificial lithium source is lithium peroxide or lithium aluminum oxide. A second example of the lithium ion battery, optionally including the first example of the lithium ion battery, further includes wherein the lithiated compound is further coated with a passivating layer, the passivating layer surrounding the surface coating.

In still another example, a method for manufacturing a positive electrode active material comprises milling a sacrificial lithium source powder to a first average size, milling a cathode catalyst powder to a second average size, and mixing and coating a lithiated core powder with the sacrificial lithium source powder and the cathode catalyst powder, wherein each of the first average size and the second average size is 1 µm or less. A first example of the method further includes wherein the sacrificial lithium source powder is lithium peroxide. A second example of the method, optionally including the first example of the method, further includes wherein the lithiated core powder has an average size of 1 to 20 µm. A third example of the method, optionally including one or more of the first and second examples of the method, further includes wherein the method further comprises applying a passivating layer.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cathode material for a lithium ion battery, comprising:
    a lithiated compound core particle; and
    a surface coating surrounding and adhered to the lithiated compound core particle, the surface coating comprising a sacrificial lithium source,
    wherein the sacrificial lithium source is in the form of particles having a particle size distribution, the particle size distribution having a peak at or below 1 µm, and wherein a passivating layer surrounds the surface coating and the surface coating is between the lithiated compound core particle and the passivating layer.

2. The cathode material of claim 1, wherein the lithiated compound core is lithium nickel manganese cobalt oxide or lithium nickel cobalt aluminum oxide.

3. The cathode material of claim 1, wherein the sacrificial lithium source is one or more of lithium peroxide, lithium oxide, lithium nitride, lithium aluminum oxide, and lithium iron oxide, and
    wherein the surface coating further comprises one or more of lithium carbonate and lithium hydroxide.

4. The cathode material of claim 1, wherein the surface coating further comprises a cathode catalyst.

5. The cathode material of claim 4, wherein the cathode catalyst is a lithium mixed metal oxide, a lithium phosphate compound, a metal oxide, or a combination thereof.

6. The cathode material of claim 5, wherein the cathode catalyst is cobalt tetraoxide.

7. The cathode material of claim 4, wherein the cathode catalyst is a first lithium mixed metal oxide and the lithiated compound core is a second lithium mixed metal oxide, where the first lithium mixed metal oxide is the same as or different than the second lithium mixed metal oxide.

8. The cathode material of claim 4, wherein the surface coating comprises a weight ratio of the sacrificial lithium source to the cathode catalyst of between 4:1 and 1:4.

9. The cathode material of claim 1, wherein the surface coating completely covers a surface of the lithiated compound core particle.

10. The cathode material of claim 1, wherein an average particle size of the sacrificial lithium source particles is smaller than an average particle size of the lithiated compound core particles.

11. The cathode material of claim 1, wherein the passivating layer is ionically and electrically conducting.

12. The cathode material of claim 1, wherein the passivating layer includes a polymer, carbon, ceramic, or zeolite.

13. A cathode material for a lithium ion battery, comprising:
    a lithiated compound core particle; and
    a surface coating surrounding and adhered to the lithiated compound core particle, the surface coating comprising a sacrificial lithium source; and
    a passivation layer, wherein the surface coating is completely covered by the passivation layer and wherein the passivation layer is ionically and electrically conducting, wherein the sacrificial lithium source is in the form of particles having a particle size distribution, the particle size distribution having a peak at or below 1 µm.

14. The cathode material of claim 13, wherein the surface coating further comprises a cathode catalyst formed of particles having a smaller average particle size than an average particle size of the sacrificial lithium source.

15. The cathode material of claim 13, wherein the surface coating further comprises a cathode catalyst and the cathode material includes more cathode catalyst than sacrificial lithium source, by weight.

* * * * *